(12) United States Patent
Daniels et al.

(10) Patent No.: US 10,457,473 B2
(45) Date of Patent: Oct. 29, 2019

(54) METHODS AND APPARATUS FOR DISPENSING SOLID ARTICLES

(71) Applicant: Parata Systems, LLC, Durham, NC (US)

(72) Inventors: Matthew P. Daniels, Pittsboro, NC (US); Steve Bouchelle, Raleigh, NC (US); Mark I. Perisich, Raleigh, NC (US)

(73) Assignee: Parata Systems, LLC, Durham, NC (US)

( * ) Notice: Subject to any disclaimer, the term of this patent is extended or adjusted under 35 U.S.C. 154(b) by 0 days.

(21) Appl. No.: 16/241,295

(22) Filed: Jan. 7, 2019

(65) Prior Publication Data

US 2019/0144195 A1  May 16, 2019

Related U.S. Application Data

(60) Continuation of application No. 15/297,895, filed on Oct. 19, 2016, now Pat. No. 10,207,857, which is a
(Continued)

(51) Int. Cl.
| | |
|---|---|
| *B65D 83/04* | (2006.01) |
| *B65G 47/14* | (2006.01) |
| *G07F 11/44* | (2006.01) |
| *G07F 11/62* | (2006.01) |
| *G07F 11/00* | (2006.01) |
| *B65B 5/10* | (2006.01) |

(Continued)

(52) U.S. Cl.
CPC .......... *B65D 83/0409* (2013.01); *B65B 5/103* (2013.01); *B65D 83/04* (2013.01); *B65G 47/1492* (2013.01); *G07F 11/005* (2013.01);

*G07F 11/44* (2013.01); *G07F 11/62* (2013.01); *B65G 47/19* (2013.01); *B65G 2201/027* (2013.01); *G07F 17/0092* (2013.01)

(58) Field of Classification Search
CPC .... G07F 17/0092; G07F 11/005; G07F 11/44; G07F 11/62; B65D 83/04; B65B 5/103; G65G 47/1492
USPC ......... 221/156, 311, 453, 110, 134; 198/453
See application file for complete search history.

(56) References Cited

U.S. PATENT DOCUMENTS

| | | |
|---|---|---|
| 2,190,620 A | 2/1940 | Milmoe et al. |
| 2,467,995 A | 4/1949 | Schlechter |

(Continued)

FOREIGN PATENT DOCUMENTS

| | | |
|---|---|---|
| EP | 1884489 | 2/2008 |
| EP | 2072427 | 6/2009 |
| FR | 2595083 | 9/1987 |

*Primary Examiner* — Patrick H Mackey
(74) *Attorney, Agent, or Firm* — Myers Bigel, P.A.

(57) ABSTRACT

A dispensing apparatus for dispensing articles includes a housing and a drive system. The housing defines a hopper chamber to hold the articles, a dispensing outlet, and a dispensing path between the hopper chamber and the dispensing outlet. The drive system includes a belt and a belt actuator operable to drive the belt. The dispensing apparatus is configured such that articles disposed in the hopper chamber are directed onto the belt and the belt, when driven by the belt actuator, conveys the articles received from the hopper chamber in a dispensing direction along the dispensing path toward the dispensing outlet to be dispensed.

25 Claims, 26 Drawing Sheets

Related U.S. Application Data division of application No. 15/046,619, filed on Feb. 18, 2016, now Pat. No. 9,499,328, which is a division of application No. 14/080,468, filed on Nov. 14, 2013, now Pat. No. 9,296,545.

(60) Provisional application No. 61/774,889, filed on Mar. 8, 2013, provisional application No. 61/774,858, filed on Mar. 8, 2013, provisional application No. 61/728,352, filed on Nov. 20, 2012.

(51) Int. Cl.
 B65G 47/19 (2006.01)
 G07F 17/00 (2006.01)

(56) References Cited

U.S. PATENT DOCUMENTS

| | | | | |
|---|---|---|---|---|
| 2,701,671 | A | 2/1955 | Lakso et al. | |
| 3,387,695 | A | 6/1968 | Hendrickson | |
| 3,710,919 | A * | 1/1973 | Maters | B65G 47/682 198/453 |
| 3,730,386 | A | 5/1973 | Monsees | |
| 3,767,027 | A | 10/1973 | Pund et al. | |
| 3,777,769 | A | 12/1973 | Ueno | |
| 3,937,455 | A | 2/1976 | Hauser | |
| 4,060,111 | A | 11/1977 | Burks | |
| 4,205,743 | A | 6/1980 | Whitmore | |
| 4,247,019 | A | 1/1981 | Lerner | |
| 4,623,059 | A * | 11/1986 | Agnew | B65G 47/682 198/452 |
| 4,651,982 | A | 3/1987 | Martin | |
| 4,677,283 | A | 6/1987 | Lewis | |
| 4,708,234 | A * | 11/1987 | Born | B65G 47/683 198/453 |
| 4,815,580 | A * | 3/1989 | Schanz | B65G 47/5136 198/347.1 |
| 4,909,375 | A | 3/1990 | Cotic et al. | |
| 5,201,508 | A | 4/1993 | Kuo | |
| 5,605,217 | A * | 2/1997 | Risley | B65G 21/2036 198/453 |
| 5,664,662 | A * | 9/1997 | Wilson | B65G 21/2036 198/453 |
| 6,024,033 | A | 2/2000 | Kinkead et al. | |
| 6,170,699 | B1 | 1/2001 | Kim | |
| 6,343,711 | B1 | 2/2002 | Coughlin | |
| 6,568,151 | B2 | 5/2003 | Buckley et al. | |
| 6,631,799 | B2 | 10/2003 | Samson | |
| 6,631,826 | B2 | 10/2003 | Pollard et al. | |
| 6,758,323 | B2 | 7/2004 | Costanzo | |
| 6,971,541 | B2 | 12/2005 | Williams et al. | |
| 6,971,544 | B2 | 12/2005 | Williams et al. | |
| 6,974,049 | B2 | 12/2005 | Williams et al. | |
| 6,974,050 | B2 | 12/2005 | Williams et al. | |
| 7,014,063 | B2 | 3/2006 | Shows et al. | |
| 7,118,006 | B2 | 10/2006 | Williams et al. | |
| 7,216,776 | B2 | 5/2007 | Gelardi | |
| 7,263,411 | B2 | 8/2007 | Shows et al. | |
| 7,269,476 | B2 | 9/2007 | Ratnakar | |
| 7,275,353 | B2 | 10/2007 | Williams et al. | |
| 7,344,049 | B2 | 3/2008 | Michelli | |
| 7,565,782 | B2 | 7/2009 | Williams et al. | |
| 7,565,784 | B2 | 7/2009 | Williams et al. | |
| 7,596,932 | B2 | 10/2009 | Sink et al. | |
| 7,795,556 | B1 | 9/2010 | Dean | |
| 7,832,591 | B2 | 11/2010 | Karwacki, Jr. et al. | |
| 7,837,061 | B2 | 11/2010 | Dummer et al. | |
| 7,866,506 | B2 | 1/2011 | Daniels et al. | |
| 7,870,973 | B2 | 1/2011 | Michelli et al. | |
| 7,878,366 | B2 | 2/2011 | Cicognani | |
| 7,905,372 | B2 | 3/2011 | Williams et al. | |
| 7,949,427 | B2 | 5/2011 | Michelli et al. | |
| 7,988,017 | B2 | 8/2011 | Kulberg et al. | |
| 7,988,404 | B2 | 8/2011 | Williams et al. | |
| 8,020,724 | B2 | 9/2011 | Remis et al. | |
| 8,054,086 | B2 | 11/2011 | Rivenbark, Jr. | |
| 8,220,657 | B2 | 7/2012 | Cicognani | |
| 8,240,506 | B2 | 8/2012 | Kulberg et al. | |
| 8,244,401 | B2 | 8/2012 | Michelli et al. | |
| 8,261,936 | B2 | 9/2012 | Dumond et al. | |
| 8,348,094 | B2 | 1/2013 | Remis et al. | |
| 8,464,901 | B2 | 6/2013 | Karwacki, Jr. et al. | |
| 8,467,899 | B2 | 6/2013 | Karwacki, Jr. et al. | |
| 8,499,967 | B2 | 8/2013 | Michelli | |
| 9,296,545 | B2 * | 3/2016 | Daniels | B65G 47/1492 |
| 9,499,328 | B2 * | 11/2016 | Daniels | B65G 47/1492 |
| 10,207,857 | B2 * | 2/2019 | Daniels | B65G 47/1492 |
| 2007/0194034 | A1 | 8/2007 | Vasiadis | |
| 2008/0110555 | A1 | 5/2008 | Bouchelle et al. | |
| 2009/0043421 | A1 | 2/2009 | Parrish et al. | |
| 2009/0057328 | A1 | 3/2009 | Ratnakar | |
| 2009/0294464 | A1 | 12/2009 | Michelli et al. | |
| 2010/0096399 | A1 | 4/2010 | Ratnakar | |
| 2010/0100237 | A1 | 4/2010 | Ratnakar | |
| 2013/0144431 | A1 | 6/2013 | Tidhar et al. | |

* cited by examiner

METHODS AND APPARATUS FOR DISPENSING SOLID ARTICLES

RELATED APPLICATION(S)

This application is a continuation application and claims priority from U.S. patent application Ser. No. 15/297,895, filed Oct. 19, 2016, which is a divisional application and claims priority from Ser. No. 15/046,619, filed Feb. 18, 2016, now U.S. Pat. No. 9,499,328, which is a divisional application and claims priority from U.S. patent application Ser. No. 14/080,468, filed Nov. 14, 2013, now U.S. Pat. No. 9,296,545, which claims the benefit of and priority from U.S. Provisional Patent Application No. 61/728,352, filed Nov. 20, 2012, U.S. Provisional Patent Application No. 61/774,858, filed Mar. 8, 2013, and U.S. Provisional Patent Application No. 61/774,889, filed Mar. 8, 2013, the disclosures of which are incorporated herein by reference.

FIELD OF THE INVENTION

The present invention is directed generally to the dispensing of solid articles and, more specifically, is directed to the automated dispensing of solid articles, such as solid pharmaceutical articles.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper). A counting sensor is positioned proximate the outlet of the dispensing channel and used to detect tablets passing the sensor in order to maintain a count of the tablets dispensed.

SUMMARY OF THE INVENTION

According to embodiments of the present invention, a dispensing apparatus for dispensing articles includes a housing and a drive system. The housing defines a hopper chamber to hold the articles, a dispensing outlet, and a dispensing path between the hopper chamber and the dispensing outlet. The drive system includes a belt and a belt actuator operable to drive the belt. The dispensing apparatus is configured such that articles disposed in the hopper chamber are directed onto the belt and the belt, when driven by the belt actuator, conveys the articles received from the hopper chamber in a dispensing direction along the dispensing path toward the dispensing outlet to be dispensed.

According to some embodiments, the dispensing apparatus is configured to singulate the articles as the articles are conveyed along the dispensing path toward the dispensing outlet to be dispensed.

In some embodiments, the dispensing apparatus includes a singulating wall having a singulating opening defined therein, wherein the singulating opening is configured and positioned to singulate the articles as the articles are conveyed along the dispensing path toward the dispensing outlet to be dispensed.

In some embodiments, the dispensing apparatus includes a singulating gate system defining a singulating opening to singulate the articles as the articles are conveyed along the dispensing path toward the dispensing outlet to be dispensed, wherein the singulating gate system is selectively adjustable to change and set at least one dimension of the singulating opening.

The singulating gate system may be selectively adjustable to interdependently change and set a width dimension and a height dimension of the singulating opening. In some embodiments, the ratio of the width dimension to the height dimension is substantially fixed. In some embodiments, the dispensing apparatus includes: a first gate member movable to adjust the width dimension; and a second gate member movable to adjust the height dimension; wherein the first and second gate members are linked such that adjustment to one of the first and second gate members automatically adjusts the other of the first and second gate members a corresponding amount. The dispensing apparatus can further include a gate actuator operable to adjust the one of the first and second gate members.

In some embodiments, the dispensing apparatus includes: a gate actuator operable to change the at least one dimension of the singulating opening; a sensor operative to detect a presence or absence of the articles downstream of the singulating opening; and a controller configured to control the gate member and to programmatically execute a self-calibration mode wherein the gate actuator is operated by the controller to progressively increase the at least one dimension of the singulating opening until an article or articles are detected by the sensor.

In some embodiments, the singulating gate system includes a plurality of guide walls collectively forming a guide shroud extending downstream from the singulating opening, the guide shroud defines a guide channel, and the singulating gate system is configured to automatically adjust at least one dimension of the guide channel in correspondence with adjustment of the singulating opening.

According to some embodiments, the singulating gate system includes a gate member defining a portion of the singulating opening and movable to change the at least one dimension of the singulating opening, and the gate member includes an integral baffle portion configured and positioned to direct the articles toward the singulating opening.

According to some embodiments, the dispensing apparatus defines a singulating opening configured to receive the articles therethrough in a prescribed orientation, and includes a redirector feature to reorient the articles into the prescribed orientation upstream of the singulating opening.

The dispensing apparatus may include a rotatable singulating wheel operable to pick up articles from the belt at a pick up location and sequentially deposit the articles downstream from the pickup location to thereby singulate the articles. In some embodiments, the singulating wheel includes a pair of transport wheels having respective opposed engagement surfaces defining an annular article receiving slot therebetween, and, in operation, the articles are captured in the article receiving slot to singulate the articles. In some embodiments, the opposed engagement surfaces are disposed at an oblique angle with respect to one another. In other embodiments, the opposed engagement surfaces are substantially parallel to one another. In some embodiments, the transport wheels are biased toward one another. The dispensing apparatus may include a separator bar configured and positioned to remove the captured articles from the article receiving slot.

According to some embodiments, the dispensing apparatus includes a non-linear singulating channel, and the belt conveys the articles through the singulating channel.

In some embodiments, the dispensing apparatus is operable to selectively drive the belt in a reverse direction to convey the articles along the dispensing path away from the dispensing outlet.

The dispensing apparatus may include an agitation mechanism configured to agitate the articles on the belt.

According to some embodiments, the dispensing apparatus includes an active feed control system including an article transport member and a feed actuator to drive the article transport member to transfer articles from the hopper chamber to the belt. The article transport member may include a feed wheel. In some embodiments, the active feed control system includes a controller and a sensor to detect articles in a staging area, and the controller is operative to control the feed actuator to drive the article transport member based on an absence of articles detected by the sensor in the staging area. In some embodiments, the dispensing apparatus includes an agitation mechanism to agitate articles in the hopper chamber. The agitation mechanism includes a movable floor member that is oscillated by the feed wheel when the feed wheel is rotated.

According to further embodiments of the present invention, a method for dispensing articles includes providing a dispensing apparatus including a housing and a drive system. The housing defines a hopper chamber to hold the articles, a dispensing outlet, and a dispensing path between the hopper chamber and the dispensing outlet. The drive system includes a belt, and a belt actuator operable to drive the belt. The method further includes dispensing the articles from the hopper chamber, including: directing articles disposed in the hopper chamber onto the belt; and driving the belt using the belt actuator to convey the articles received from the hopper chamber in a dispensing direction along the dispensing path toward the dispensing outlet to be dispensed.

According to further embodiments of the present invention, a dispensing apparatus for dispensing articles includes a housing, a drive system and a singulating gate system. The housing defines a hopper chamber to hold the articles, a dispensing outlet, and a dispensing path between the hopper chamber and the dispensing outlet. The drive system is operable to convey the articles in a dispensing direction along the dispensing path toward the dispensing outlet to be dispensed. The singulating gate system defines a singulating opening to singulate the articles as the articles are conveyed along the dispensing path toward the dispensing outlet to be dispensed. The singulating gate system is selectively adjustable to interdependently change and set a width dimension and a height dimension of the singulating opening.

According to further embodiments of the present invention, a method for dispensing articles includes providing a dispensing apparatus including a housing, a drive system, and a singulating gate system. The housing defines a hopper chamber to hold the articles, a dispensing outlet, and a dispensing path between the hopper chamber and the dispensing outlet. The drive system is operable to convey the articles in a dispensing direction along the dispensing path toward the dispensing outlet to be dispensed. The singulating gate system defines a singulating opening to singulate the articles as the articles are conveyed along the dispensing path toward the dispensing outlet to be dispensed. The singulating gate system is selectively adjustable to interdependently change and set a width dimension and a height dimension of the singulating opening. The method further includes: adjusting one of the width dimension and the height dimension of the singulating opening and thereby automatically and interdependently adjusting the other of the width dimension and the height dimension; and using the drive system, conveying the articles in the dispensing direction along the dispensing path and through the singulating opening.

According to further embodiments of the present invention, a dispensing apparatus for dispensing articles includes a housing, a drive system and a rotatable singulating wheel. The housing defines a hopper chamber to hold the articles, a dispensing outlet, and a dispensing path between the hopper chamber and the dispensing outlet. The drive system is operable to convey the articles in a dispensing direction along the dispensing path toward the dispensing outlet to be dispensed. The singulating wheel is operable to pick up articles at a pick up location and sequentially deposit the articles downstream from the pickup location to thereby singulate the articles as the articles are conveyed along the dispensing path toward the dispensing outlet to be dispensed.

According to further embodiments of the present invention, a method for dispensing articles includes providing a dispensing apparatus including a housing, a drive system and a rotatable singulating wheel. The housing defines a hopper chamber to hold the articles, a dispensing outlet, and a dispensing path between the hopper chamber and the dispensing outlet. The drive system is operable to convey the articles in a dispensing direction along the dispensing path toward the dispensing outlet to be dispensed. The method further includes: using the drive system, conveying the articles in the dispensing direction along the dispensing path and through the singulating opening; and using the singulating wheel, picking up articles at a pick up location and sequentially depositing the articles downstream from the pickup location to thereby singulate the articles as the articles are conveyed along the dispensing path toward the dispensing outlet to be dispensed.

According to further embodiments of the present invention, a dispensing apparatus for dispensing articles includes a housing, a drive system and an active feed control system. The housing defines a hopper chamber to hold the articles, a dispensing outlet, and a dispensing path between the hopper chamber and the dispensing outlet. The drive system is operable to convey the articles in a dispensing direction along the dispensing path from a staging area toward the dispensing outlet to be dispensed. The active feed control system includes an article transport member and a feed actuator to drive the article transport member to transfer articles from the hopper chamber to the staging area.

According to further embodiments of the present invention, a method for dispensing articles includes providing a dispensing apparatus including a housing, a drive system and an active feed control system. The housing defines a hopper chamber to hold the articles, a dispensing outlet, and a dispensing path between the hopper chamber and the dispensing outlet. The drive system is operable to convey the articles in a dispensing direction along the dispensing path from a staging area toward the dispensing outlet to be dispensed. The active feed control system includes an article transport member and a feed actuator to drive the article transport member. The method further includes: driving the article transport member using the feed actuator to transfer articles from the hopper chamber to the staging area; and using the drive system, conveying the articles from the staging area in the dispensing direction along the dispensing path and through the singulating opening.

According to further embodiments of the present invention, a dispensing apparatus for dispensing articles includes a housing, a drive system, and a singulating gate system. The housing defines a hopper chamber to hold the articles, a dispensing outlet, and a dispensing path between the hopper chamber and the dispensing outlet. The drive system is operable to convey the articles in a dispensing direction along the dispensing path toward the dispensing outlet to be dispensed. The singulating gate system defines a singulating opening to singulate the articles as the articles are conveyed along the dispensing path toward the dispensing outlet to be dispensed. The singulating gate system is selectively adjustable to change and set at least one dimension of the singulating opening. The singulating gate system includes: a gate actuator operable to change the at least one dimension of the singulating opening; a sensor operative to detect a presence or absence of the articles downstream of the singulating opening; and a controller configured to control the gate member and to programmatically execute a self-calibration mode wherein the gate actuator is operated by the controller to progressively increase the at least one dimension of the singulating opening until an article or articles that pass through the singulating opening and are detected by the sensor.

According to further embodiments of the present invention, a method for dispensing articles includes providing a dispensing apparatus including a housing, a drive system, and a singulating gate system. The housing defines a hopper chamber to hold the articles, a dispensing outlet, and a dispensing path between the hopper chamber and the dispensing outlet. The drive system is operable to convey the articles in a dispensing direction along the dispensing path toward the dispensing outlet to be dispensed. The singulating gate system defines a singulating opening to singulate the articles as the articles are conveyed along the dispensing path toward the dispensing outlet to be dispensed. The singulating gate system is selectively adjustable to change and set at least one dimension of the singulating opening. The method further includes: using the drive system, conveying the articles in the dispensing direction along the dispensing path and toward the singulating opening; and calibrating the singulating gate system, including progressively increasing the at least one dimension of the singulating opening until an article or articles pass through the singulating opening.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
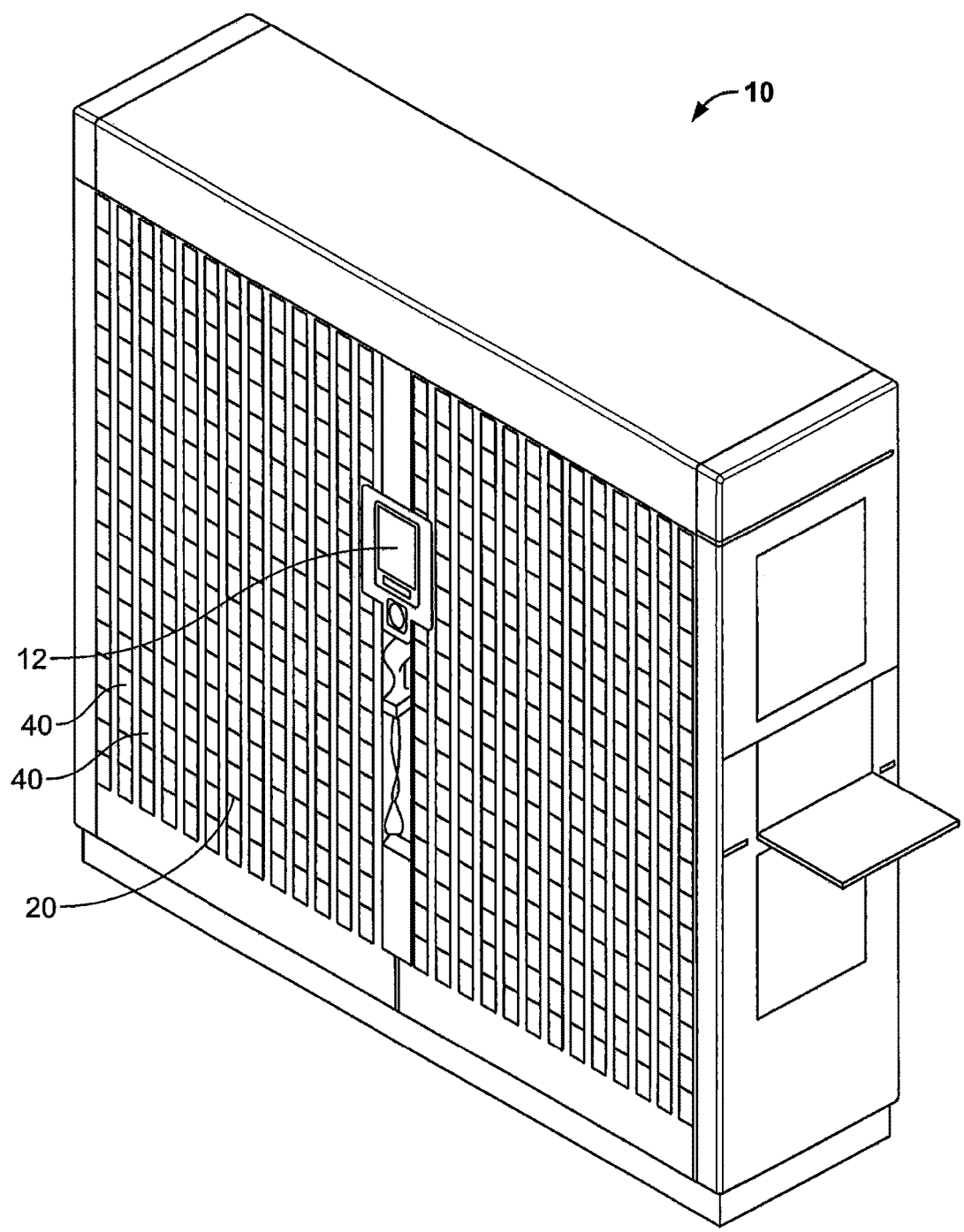
FIG. 1 is a front perspective view of a pharmaceutical tablet dispensing system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "programmatically" refers to operations directed and/or primarily carried out electronically by computer program modules, code and instructions.

In accordance with embodiments of the present invention, apparatus and methods are provided for dispensing solid articles. According to some embodiments, the solid articles are solid pharmaceutical articles. In particular, such methods and apparatus may be used to dispense pharmaceutical pills or tablets.

Figure 2:
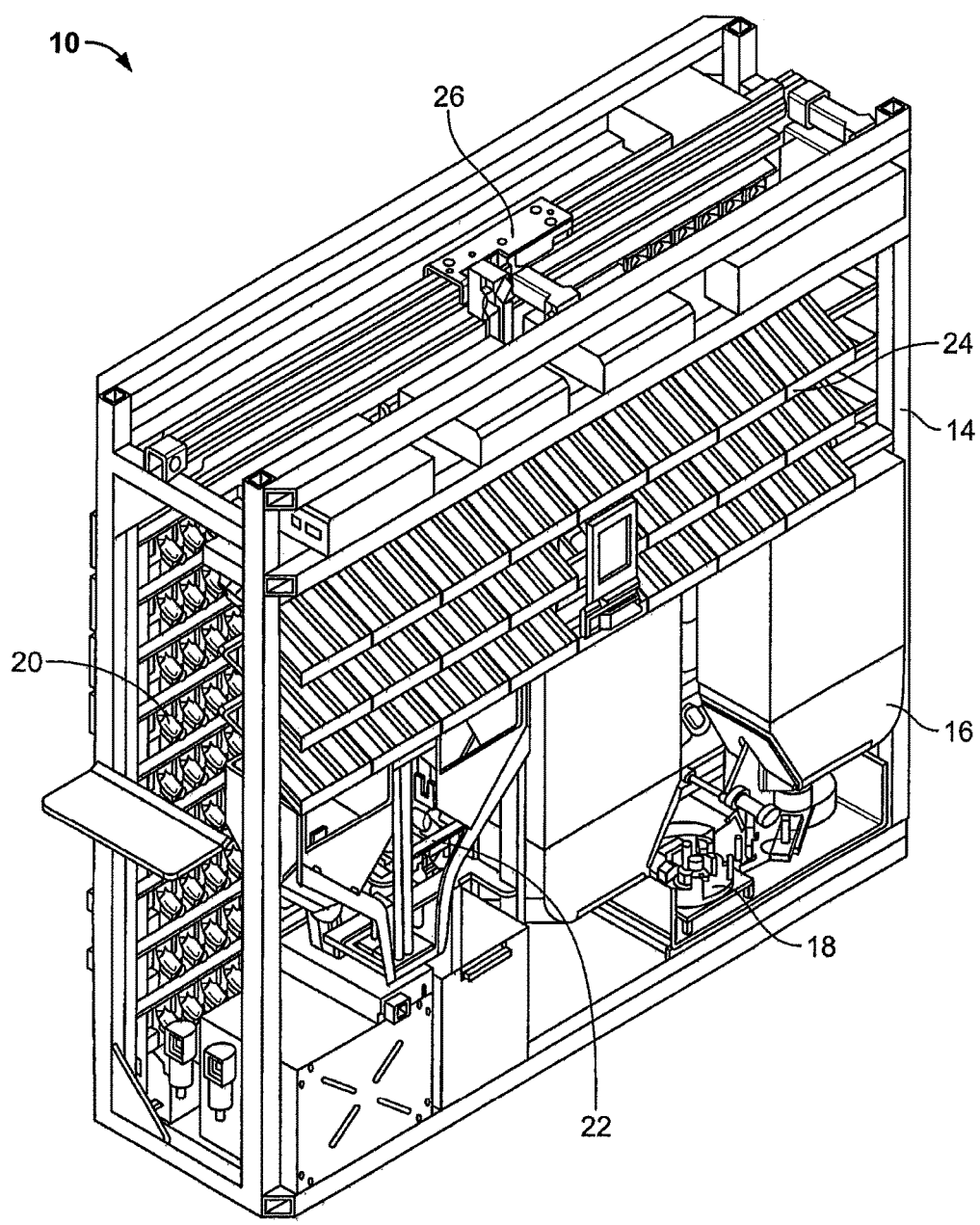
FIG. 2 is a cutaway, rear perspective view of the tablet dispensing system of FIG. 1.

A dispensing system according to embodiments of the present invention and that can carry out the foregoing methods is illustrated in FIGS. 1-9 and designated broadly therein at 10 (FIGS. 1 and 2). The dispensing system 10 includes a support frame 14 for the mounting of its various components. Those skilled in this art will recognize that the frame 14 illustrated herein is exemplary and can take many configurations that would be suitable for use with the present invention. The frame 14 provides a strong, rigid foundation to which other components can be attached at desired locations, and other frame forms able to serve this purpose may also be acceptable for use with this invention.

The system 10 generally includes as operative stations a controller (represented herein by a graphical user interface 12), a container dispensing station 16, a labeling station 18, a tablet dispensing station 20, a closure station 22, and an offloading station 24. In the illustrated embodiment, containers, tablets and closures are moved between these stations with a dispensing carrier 26; however, in some embodiments, multiple carriers are employed. The dispensing carrier 26 has the capability of moving the container to designated locations within the frame 14. Except as discussed herein with regard to the dispensing station 20, each of the operative stations and the conveying devices may be of any suitable construction such as those described in detail in U.S. Patent Publication No. 2008-0110555 and U.S. Pat. Nos. 6,971,541; 7,344,049; 7,596,932; and 8,261,936, the disclosures of which are hereby incorporated herein in their entireties.

The controller 12 controls the operation of the remainder of the system 10. The controller 12 may programmatically and automatically or semi-automatically control the system 10 as described herein. In some embodiments, the controller 12 will be operatively connected with an external device, such as a personal or mainframe computer, that provides input information regarding prescriptions. In other embodiments, the controller 12 may be a stand-alone computer that directly receives manual input from a pharmacist or other operator. The controller 12 may be distributed with a portion thereof mounted on each bin as described hereinbelow. As used herein, the controller 12 may refer to a central controller and/or a dedicated controller onboard an associated bin. An exemplary controller is a conventional microprocessor-based personal computer.

In operation, the controller 12 signals the container dispensing station 16 that a container of a specified size is desired. In response, the container dispensing station 16 delivers a container to the labeling station 18. The labeling station 18 includes a printer that is controlled by the controller 12. The printer prints and presents an adhesive label that is affixed to the container. The carrier 26 moves the labeled container to the appropriate bin 40 for dispensing of tablets in the container.

Filling of labeled containers with tablets is carried out by the tablet dispensing station 20. The tablet dispensing station 20 comprises a plurality of tablet dispensing bin assemblies or bins 100 (described in more detail below), each of which holds a bulk supply of individual tablets (typically the bins 100 will hold different tablets). Referring to FIGS. 3-8, the dispensing bins 100, which may be substantially identical in size and configuration, are organized in an array mounted on the rails of the frame 14. Each dispensing bin 100 has a dispensing passage or channel 150 that communicates with a portal or outlet 130B that faces generally in the same direction to create an access region for the dispensing carrier 26. The identity of the tablets in each bin is known by the controller 12, which can direct the dispensing carrier 26 to transport the container to the proper bin 100. In some embodiments, the bins 100 may be labeled with a bar code, RFID tag or other indicia to allow the dispensing carrier 26 to confirm that it has arrived at the proper bin 100.

The dispensing bins 100 are configured to singulate, count, and dispense the tablets contained therein, with the operation of the bins 100 and the counting of the tablets being controlled by the controller 12. Some embodiments may employ the controller 12 as the device which monitors the locations and contents of the bins 100; others may employ the controller 12 to monitor the locations of the bins, with the bins 100 including indicia (such as a bar code or electronic transmitter) to identify the contents to the controller 12. In still other embodiments, the bins 100 may generate and provide location and content information to the controller 12, with the result that the bins 100 may be moved to different positions on the frame 14 without the need for manual modification of the controller 12 (i.e., the bins 100 will update the controller 12 automatically).

After the container is desirably filled by the tablet dispensing station 20, the dispensing carrier 26 moves the filled container to the closure dispensing station 22. The closure dispensing station 22 may house a bulk supply of closures and dispense and secure them onto a filled container. The dispensing carrier 26 then moves to the closed container, grasps it, and moves it to the offloading station 24.

Turning to the bins 100 in more detail, an exemplary bin 100 is shown in more detail in FIGS. 3-9. The bin 100 includes a housing 110, a drive system 160, a sensor system 170, an onboard controller 174, and an interface connector 174A. When the bin 100 is mounted in the frame 14, the interface connector 174A operatively engages a mating connector in the frame 14 to supply power to the bin 100 and to enable transmission of data (including commands) to and from the bin 100.

The housing 110 includes a hopper portion 120, a nozzle 130, and a dispensing portion 140. The hopper portion 120 defines a hopper chamber 120A that can be filled with tablets T. The bin 100 can be filled or replenished with tablets through an opening located at the upper rear portion of the bin 100. The opening is selectively accessible via a pivoting door, for example, that normally resides in a closed position.

The tablets T can be dispensed one at a time into the container C (FIGS. 7 and 8) through the dispensing portion 140. The bin 100 defines a tablet dispensing path from the hopper chamber 120A, through the dispensing portion 140, and through the nozzle 130.

The hopper portion 120 includes a bottom wall or floor 122, side walls 124, a first partition wall 126, and a second partition wall 128. The lower ends of the partition walls 126 and 128 define first and second gaps or choke points 126A and 128A, respectively, with the floor 122. An elongate belt opening 146 is defined in the floor 122.

The dispensing portion includes a staging region or area 142 proximate the hopper chamber 120A and a singulating wall 144 proximate the nozzle 130. A singulating opening 144A is defined in the wall 144. Laterally opposed singulating baffles 152 and 154 define a guide channel 156. The guide channel 156 and the singulating opening 144A collectively form a dispensing channel 150. The dispensing channel 150 effectively defines a dispensing path P for the tablets T. In some embodiments and as shown, the baffles 152, 154 each include a plurality of angled wall surfaces 152A, 154A (sloped downwardly toward the belt opening 146) that, as shown, may be arranged asymmetrically about the longitudinal axis of the guide channel 156.

The nozzle 130 defines a nozzle passage 130A extending from proximate the singulating opening 144A to a nozzle outlet 130B.

The drive system 160 includes a pair of longitudinally spaced apart rollers 162, 164, a conveyor belt 166, and an actuator (e.g., an electric motor 168). The belt 166 is an endless band encircling each of the rollers 162, 164. The motor 168 is operatively connected to the roller 162 by an output shaft 168A to forcibly rotate the roller 162 and thereby drive the belt 166 around the rollers 162, 164. The belt 166 has a continuous, endless, outwardly facing engagement surface 166B. Cooperating teeth 166E and 162A, 164A may be provided on the belt 166 and rollers 162, 164.

A section 166A of the belt 166 is positioned in or closely adjacent the belt opening 146 so that an exposed section 169 of the engagement surface 166B is exposed through the opening 146. The exposed section 169 extends from a take up end 166C to a release or drop off end 166D. It will be appreciated that the portion of the engagement surface 166B of the belt 166 constituting the exposed section 169 varies as the belt 166 travels around the rollers 162, 164. The motor 168 is selectively operable to drive the belt 166 in each of a forward direction BF (wherein the exposed section 169 of the engagement surface 166B travels in a direction from end 166C to end 166D) and a reverse direction BR (wherein the exposed section 169 of the engagement surface 166B travels in a direction from end 166D to end 166C).

The belt 166 may be of any suitable type and construction. In some embodiments, the belt 166 is formed of an elastomeric material (e.g., rubber or polyurethane). The engagement surface 166B should have sufficient frictional properties relative to the tablets T to engage and carry the tablets. Suitable materials for the belt 166 engagement surface 166B may include polyurethane, rubber, foam polymer, or polyvinyl chloride (PVC). In some embodiments, the engagement surface 166B is textured to enhance its grip on the tablets T. In some embodiments, the controller 174 will slow down the speed of the belt 166 near the end of the count to ensure accuracy.

Figure 3:
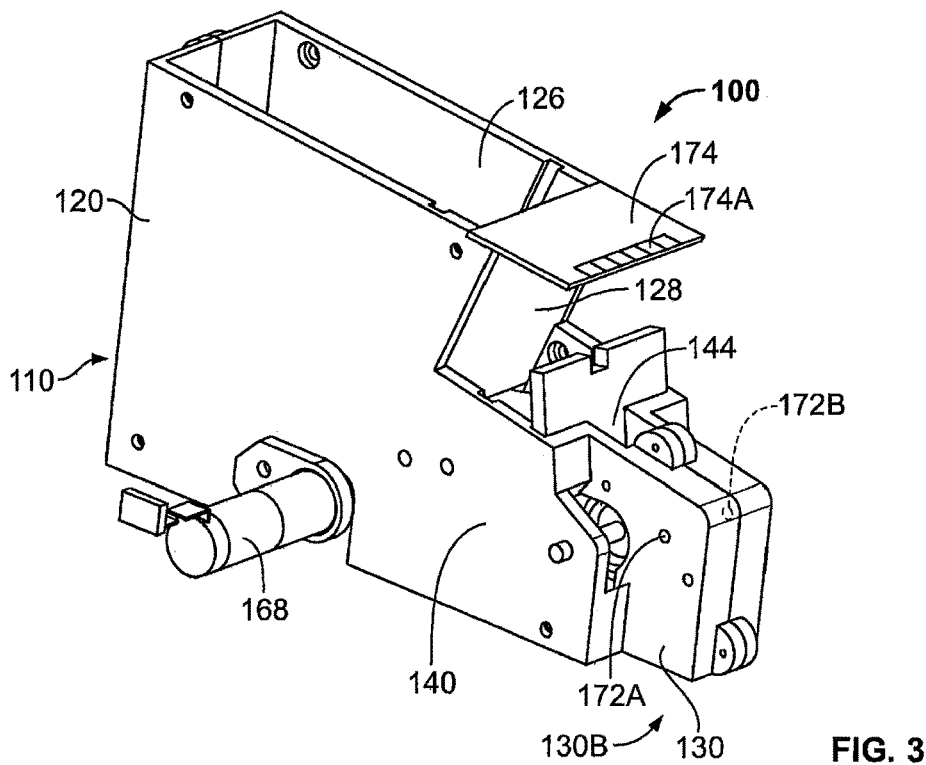
FIG. 3 is a front perspective view of a dispensing bin according to embodiments of the present invention and forming a part of the tablet dispensing system of FIG. 1.
Figure 4:
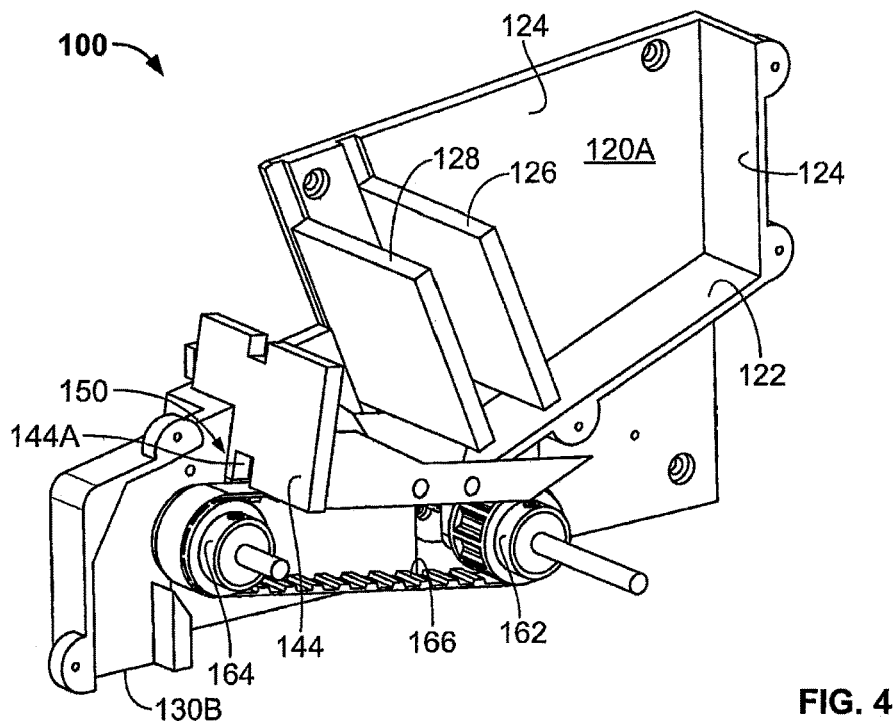
FIG. 4 is a fragmentary front perspective view of the dispensing bin of FIG. 3.
Figure 5:
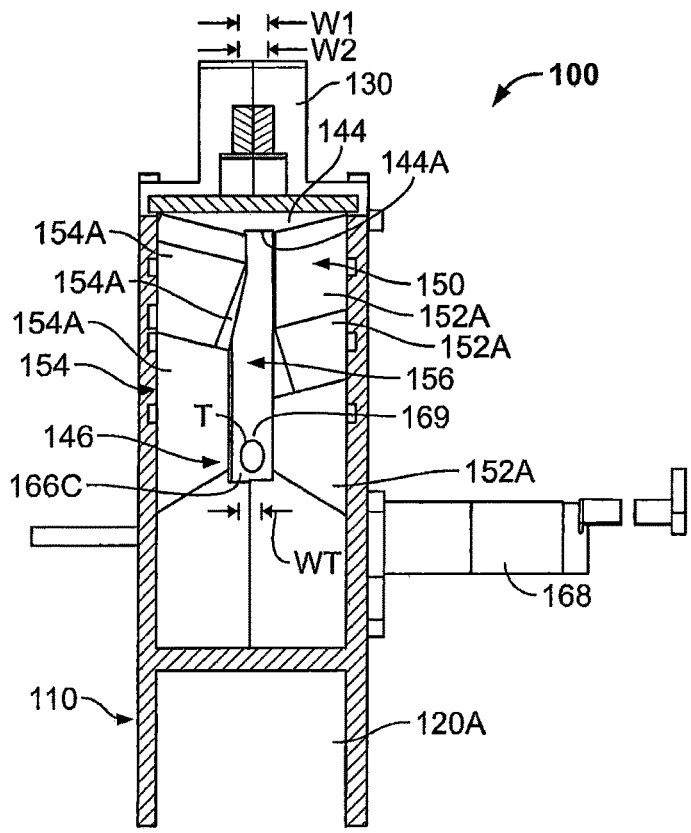
FIG. 5 is a fragmentary, top view of the dispensing bin of FIG. 3.

The sensor system 170 may include one or more radiation detectors (e.g., photodetectors) and radiation emitters (e.g., photoemitters). An exemplary photodetector 172A and photoemitter 172B are shown in FIG. 3. More or fewer detectors may be provided and at different locations. For example, detectors may be located upstream, downstream (e.g., in or near the nozzle outlet 130B) and/or at the belt drop off end 166D.

The photodetector(s) may be configured and positioned to detect the tablets T as they pass through the dispensing channel 150. The photodetector(s) can be configured to generate detector signals that are proportional to the light received thereby. The photoemitter(s) may be positioned and configured to generate light that is directed toward the photodetector(s) across the dispensing pathway of the tablets T. In this manner, when a tablet T interrupts the light transmitted from the photoemitter to the photodetector, the detector signal will change based on the reduced light being received at the respective photodetector. According to some embodiments, the controller 12 uses detection signals from the photodetector to count the dispensed tablets, to assess a tablet or tablets, and/or to determine conditions or performance in tablet dispensing. In some cases, the sensor system operates the motor 168 or other devices in response to identified or determined count, conditions or performance in dispensing.

Exemplary operation of the dispensing system 10, including more particular operation of the bin 100, will now be described. The bin 100 is filled with tablets T to be dispensed. The tablets T may initially be at rest. At this time, the motor 168 may be at rest so that the belt 166 is not driven.

Figure 7:
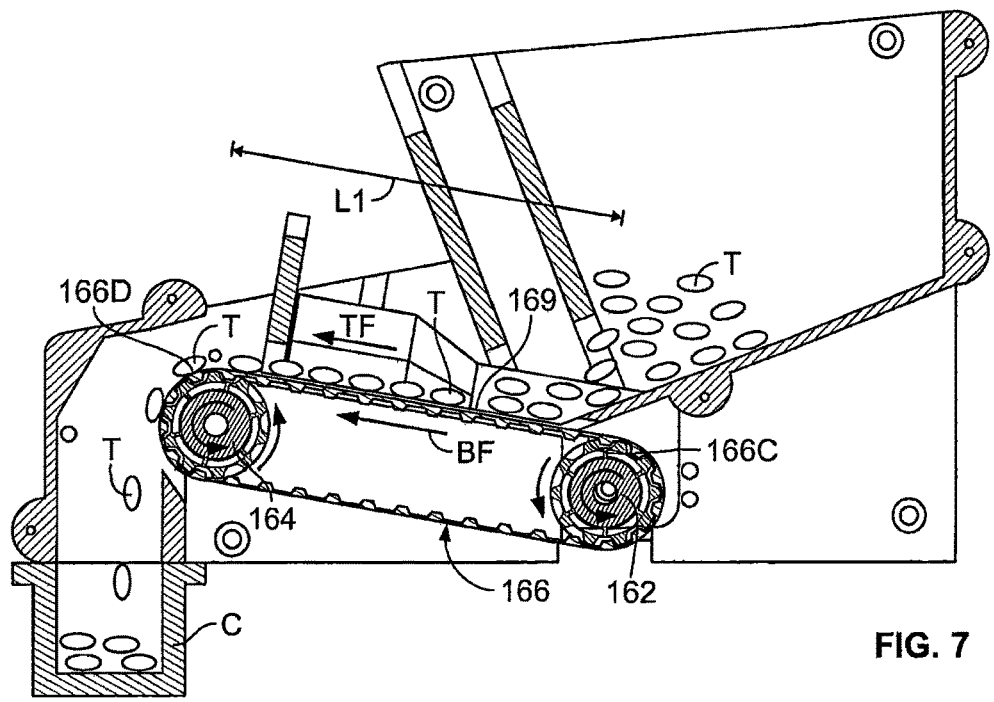

When it is desired to dispense the tablets T to fill the container C, the dispensing carrier 26, directed by the controller 12, moves the container C to the nozzle outlet 130B of the nozzle 130 of the selected dispensing bin 100. Once the container C is properly positioned, the controller 174 actuates the motor 168 to drive the belt 166 in the forward direction BF as shown in FIG. 7. In some embodiments or operations, the controller 174 first actuates the motor 168 to drive the belt in the reverse direction BR to pre-clear the dispensing channel singulating area, before driving the belt 166 in the forward direction BF to dispense.

The tablets T stored in the hopper chamber 120A gravity feed progressively through the choke passage 126A, 126B to the staging area 142. At the staging area 142, the tablets T slide or fall onto the belt engagement surface 166B on or near the take up end 166C. Each deposited tablet T is conveyed or transported forward by the drive belt 166 in a dispensing or forward direction TF along the dispensing path P through the dispensing channel 150, the nozzle passage 130A, and the nozzle outlet 130B to the waiting container C.

The photodetector 172A detects the tablets T as they pass thereby along the dispensing path P.

In order to present the dispensed tablets T to the photodetector 172A sequentially so that the tablets T can be accurately counted, the bin 100 singulates the dispensed tablets T upstream of the photodetector 172A (FIG. 3). The tablets T are sequenced or singulated, and may be oriented into a preferred orientation, by the shape of the guide channel 156, the shapes of the baffles 152, 154, the shape of the singulating opening 144A, and/or the action, configuration and/or properties of the belt 166. More particularly, as the belt 166 picks up the tablets T at its end 166C and draws them through the narrow guide channel 156, the conveyed tablets T will tend to align sequentially along the length of the belt engagement surface 166B. The staggered baffle walls 152A, 154A will also tend to direct or reshuffle the tablets in and entering the guide channel 156 into a singulated series of tablets. In the event a tablet T is not suitably singulated or aligned by the time it reaches the opening 144A, the singulating wall 144 can serve to singulate the tablet or, failing that, block the tablet from proceeding.

Figure 6:
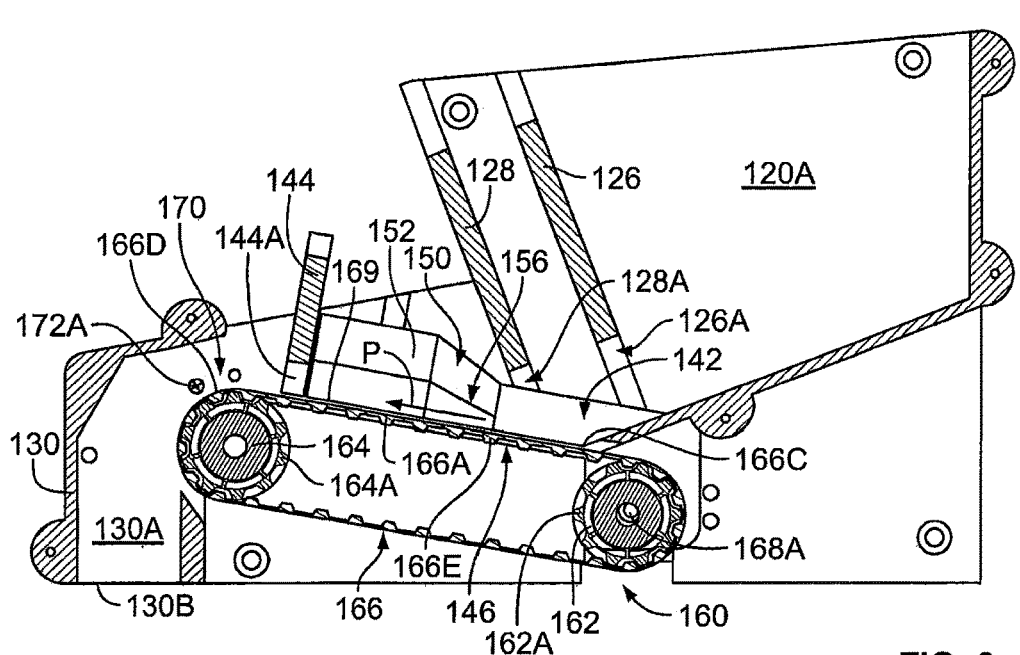
FIGS. 6-8 are cross-sectional views of the dispensing bin of FIG. 3 showing operations thereof.
Figure 9:
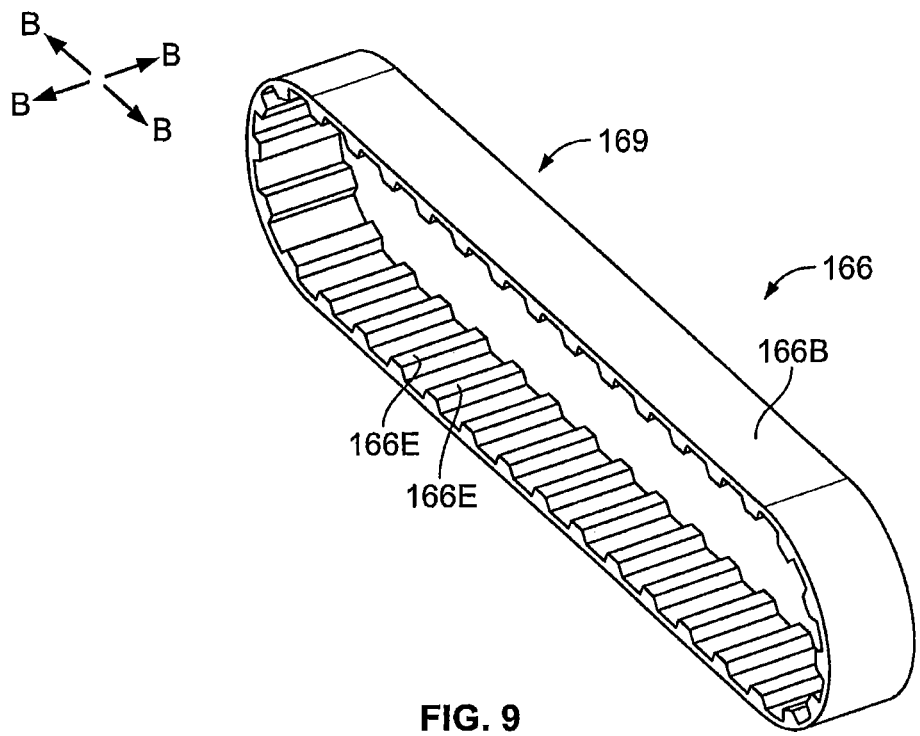
FIG. 9 is a perspective view of a conveyor belt forming a part of the dispensing bin of FIG. 3.

According to some embodiments and with reference to FIGS. 6 and 9, the exposed section 169 is substantially planar and lies in a plane B across substantially its full length and width. Thus, the conveyed tablets T will ride on the engagement surface 166B on the plane B and will not sink into or fall into cavities in the belt 166.

According to some embodiments, the nominal widths W1 and W2 (FIG. 5) of the guide channel 156 and the singulating opening 144A are in the range of from about 0.5 to 4 mm greater than the width WT (FIG. 5) of the tablets T. In some embodiments, the widths W1, W2 are in the range of from about 25 to 50 percent great than the width W3.

According to some embodiments, the length L1 (FIG. 7) of the belt engagement section 169 is at least 2 inches and in some embodiments, in the range of from about 3 to 4 inches.

Figure 8:
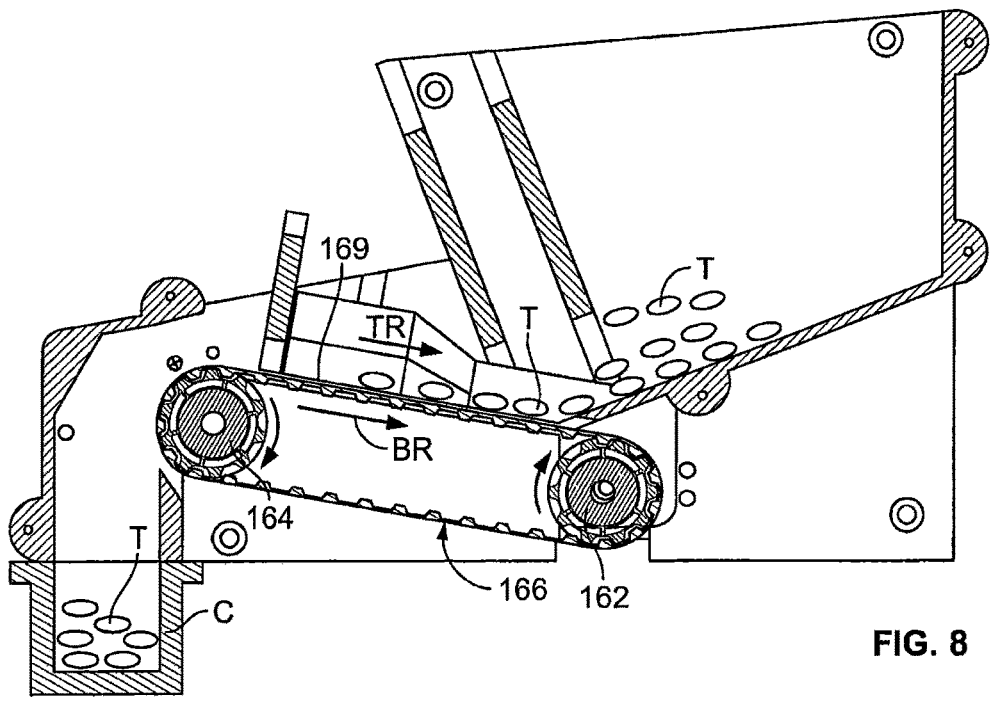

Once dispensing is complete (i.e., a predetermined number of tablets has been dispensed and counted), the controller 174 will initiate a reverse mode and reverse the drive direction of the motor 168 to drive the belt 166 and the engagement surface 166B in a reverse direction BR as shown in FIG. 8. In this manner, any tablets T remaining in the guide channel 156 on the belt 166 are returned in a reverse direction TR toward the hopper chamber 120A and the staging area 142 under the drive force of the reversed belt 166.

During a dispensing cycle (i.e., when the belt 166 is being driven in the forward direction BF), the controller 174 may determine that a tablet jam condition is or may be present. A tablet jam is a condition wherein one or more tablets are caught up in the bin 100 such that tablets T will not feed into or through the opening 144A under the influence of the drive belt 166. Tablets may form a jam at the opening 144A or elsewhere so that no tablets are sensed passing through the nozzle 130 for a prescribed period of time while the belt 166 is being driven forward. When a tablet jam is identified by the controller 174, the controller 174 will issue a "jam clear" to clear a perceived tablet jam. In the jam clear mode, the controller 174 will drive the belt 166 in the reverse direction BR as discussed above. The reverse driven belt 166 may serve to dislodge any such jams as well as to loosen the tablets in the hopper chamber 120A.

Typically, an operator will request that a desired number of tablets be dispensed ("the requested count"). The sensor system can detect the tablets T as they pass through predetermined points along the dispensing path P. The controller 174 may use the detection signals from the photodetectors to monitor and maintain a registered count of the tablets T dispensed ("the system count"). When the system count matches the requested count, the controller 174 will deem the dispensing complete and cease dispensing of the tablets T. In some embodiments, the controller 174 will slow down the speed of the belt 166 near the end of the count to ensure accuracy.

Figure 10:
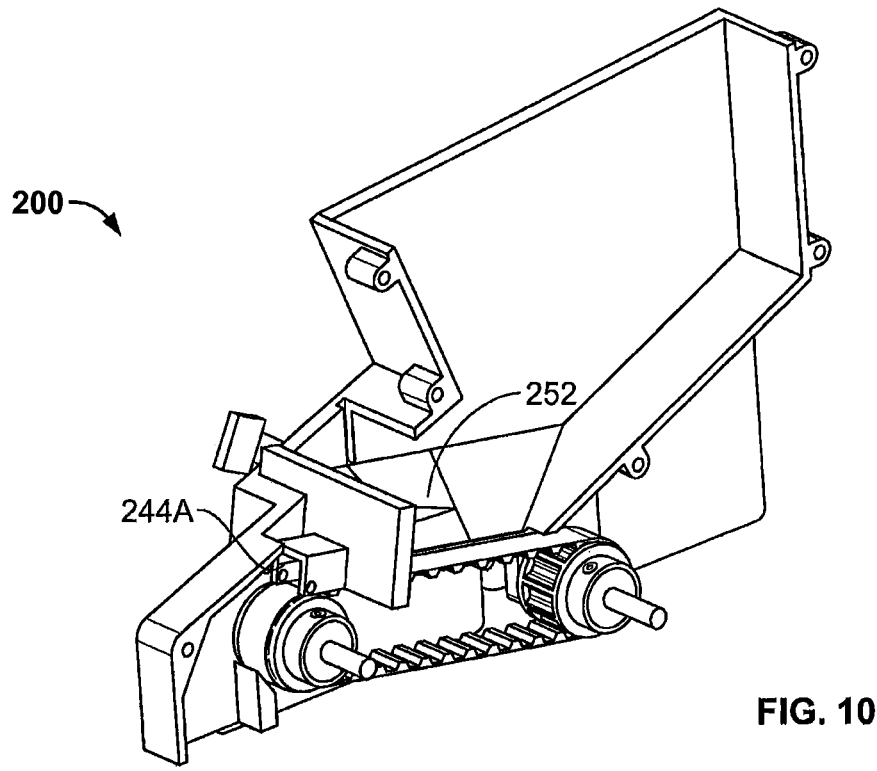
FIG. 10 is a fragmentary perspective view of a dispensing bin according to further embodiments of the invention and which may form a part of the tablet dispensing system of FIG. 1.
Figure 11:
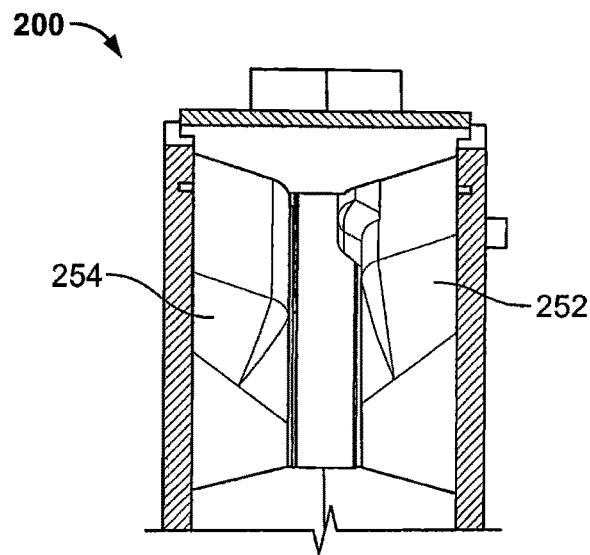
FIG. 11 is a fragmentary, top view of the dispensing bin of FIG. 10.

With reference to FIGS. 10 and 11, a bin 200 according to further embodiments of the invention is shown therein. The bin 200 may be used in place of the bin 100. The bin 200 differs from the bin 100 in that the singulating opening 244A and singulating baffles 252, 254 are differently configured. Some nonlimiting examples of differences that may occur in the configuration are different size and/or shape of the singulating opening 244A, or different sizes, shapes or angles of the singulating baffles 252.

Figure 12:
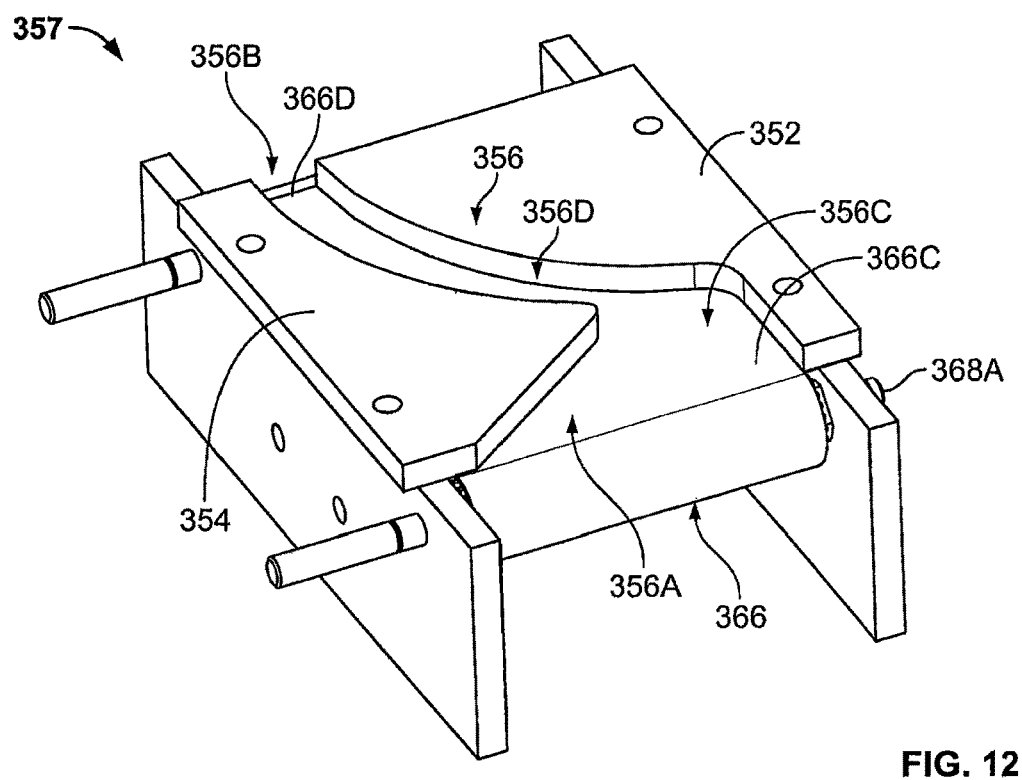
FIG. 12 is a rear perspective view of a tablet drive and guide system according to further embodiments of the present invention and that may form a part of the tablet dispensing system of FIG. 1.

With reference to FIG. 12, an alternative tablet drive and guide system 357 is shown therein in fragmentary perspective view. The tablet drive and guide system 357 may be provided in place of or in addition to the baffles 152, 154 of the bin 100, for example. The system 357 includes a drive belt 366 corresponding to the belt 166 and driven by a motor (not shown) via an output shaft 368A. Opposed baffles 352, 354 define a nonlinear guide channel 356 extending from an inlet 356A (at the take up end 366C of the belt 366) to an outlet 356B (at the drop off end 366D of the belt 366). As will be appreciated from the drawing, the guide channel 356 has a relatively wide receiving section 356C that collects and funnels tablets T from the hopper into a relatively narrow singulating section 356D as the tablets T are conveyed through the channel 356. The singulating section 356D follows an arcuate path that assists in desirably singulating and orienting the tablets T.

Figure 13:
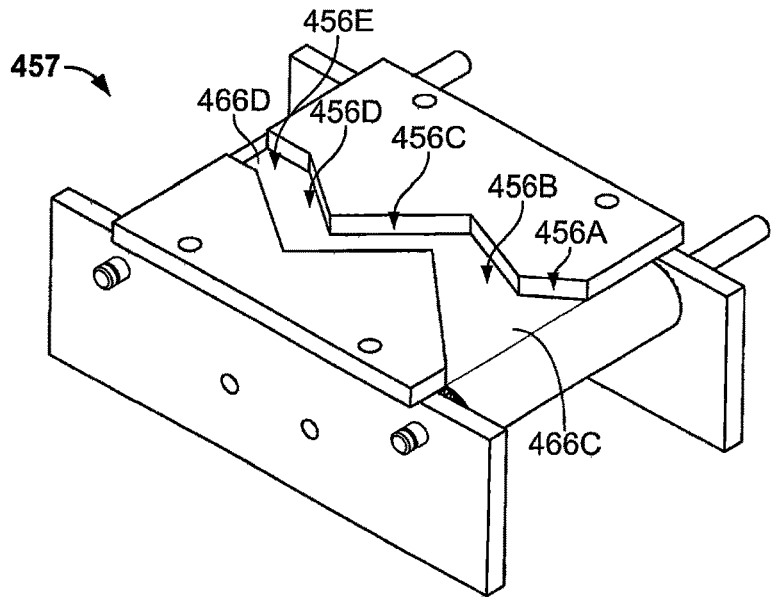
FIG. 13 is a rear perspective view of a further tablet drive and guide system according to embodiments of the present invention and that may form a part of the tablet dispensing system of FIG. 1.
Figure 14:
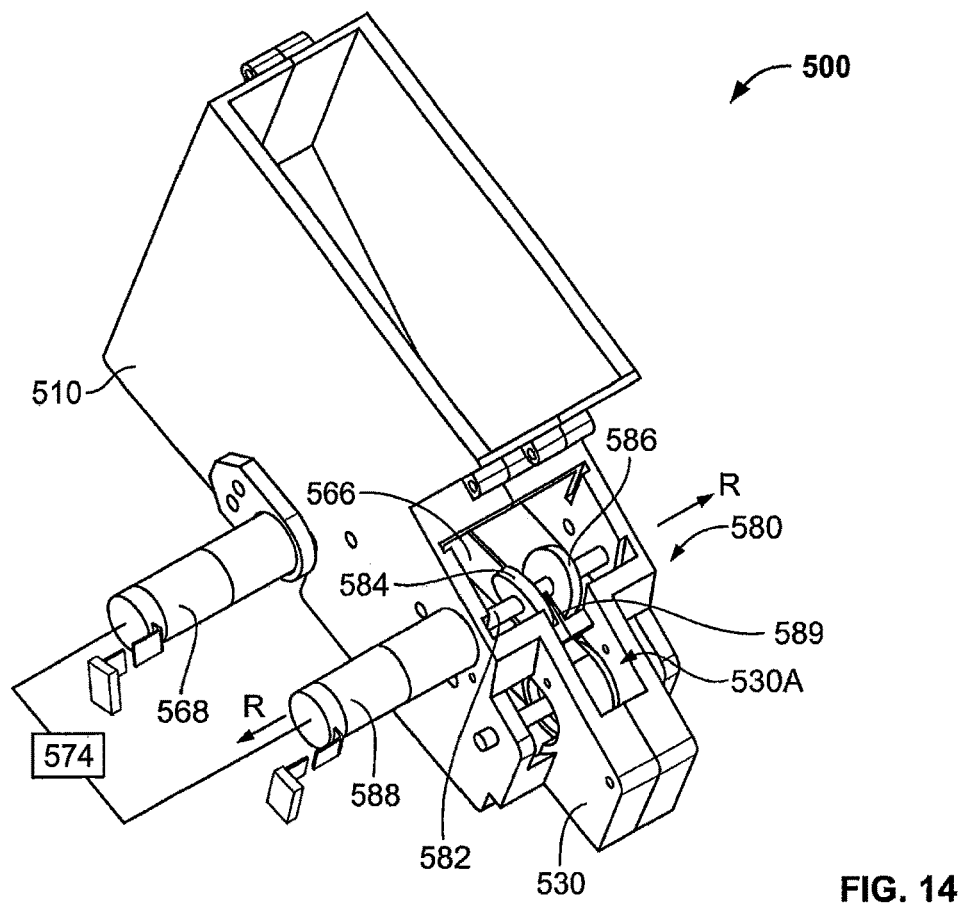
FIG. 14 is a front perspective view of a dispensing bin according to further embodiments of the invention and which may form a part of the tablet dispensing system of FIG. 1.
Figure 15:
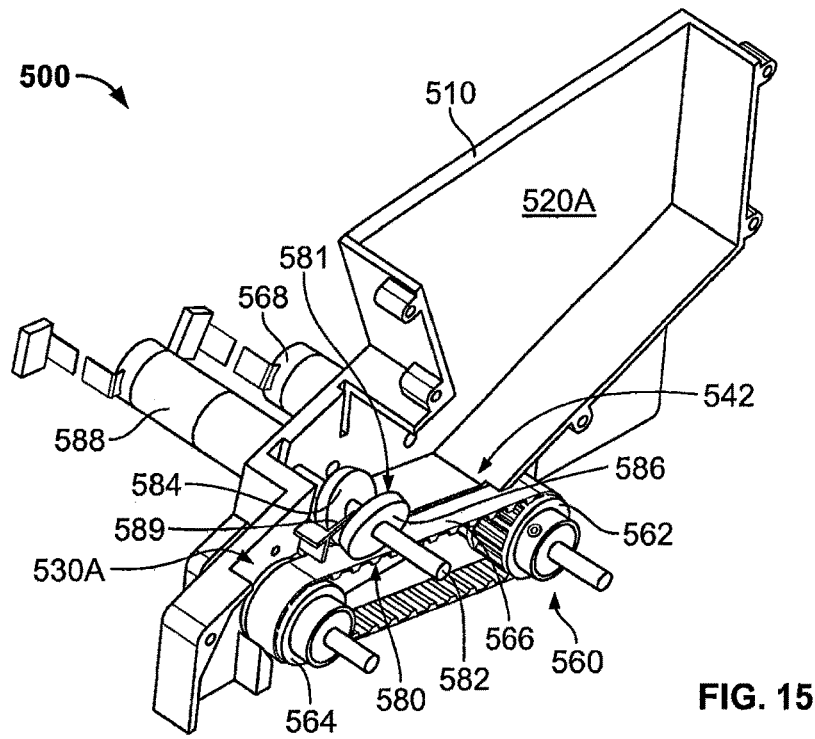
FIG. 15 is a cross-sectional perspective view of the dispensing bin of FIG. 14.
Figure 16:
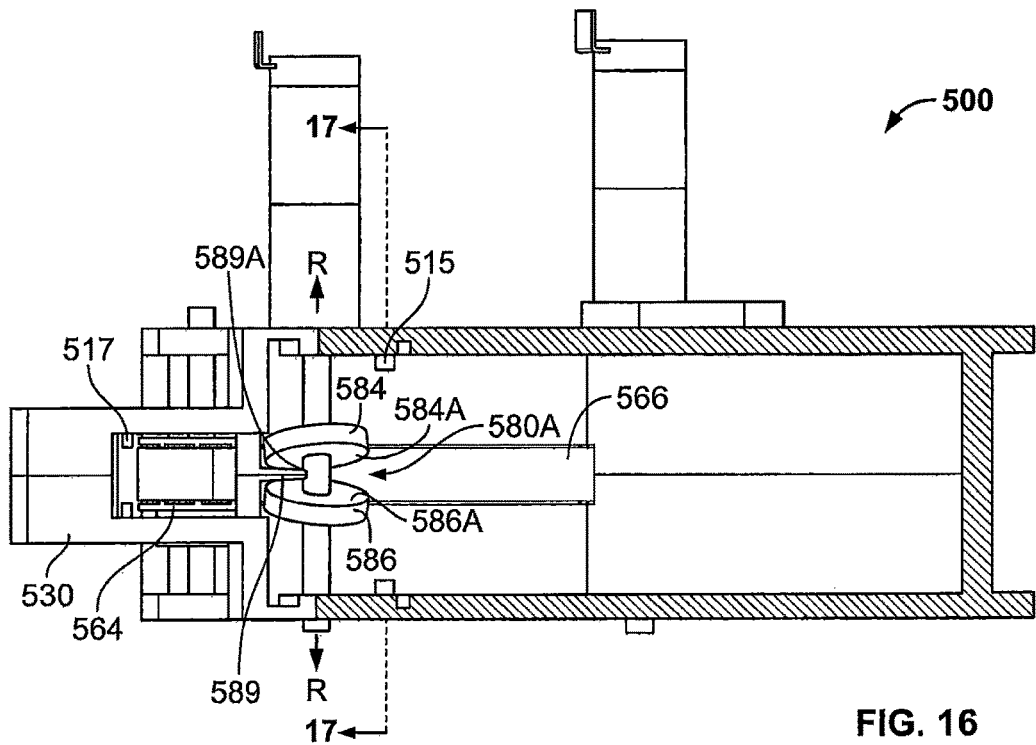
FIG. 16 is a fragmentary, top view of the dispensing bin of FIG. 14.

Referring to FIG. 13, an alternative tablet drive and guide system 457 is shown therein and can be provided in place of the system 357. The system 457 differs from the system 357 in that the system 457 includes baffles defining a nonlinear guide channel 456 having a receiving section 456A and a plurality of singulating sections 456B, 456C, 456D, 456E defining a zig-zag or serpentine path for the tablets T as they are conveyed by the drive belt 466 from the take up end 466C to the drop off end 466D.

With reference to FIGS. 14-18, a bin 500 according to further embodiments of the present invention is shown therein. The bin 500 may be used in place of the bin 100. The bin 500 corresponds generally to the bin 100, but differs from the bin 100 in that the bin 500 includes a primary drive system 560 corresponding to the drive system 160 and also a secondary drive system 580 as discussed in more detail below. Generally, the primary drive system 560 conveys tablets T (initially disposed in the hopper chamber 520A of the housing 510) from a primary staging region 542 (corresponding to the staging region 142) to a secondary staging region 581, and the secondary drive system 580 conveys the tablets T from the secondary staging region 581 to the nozzle 530.

Turning to the bin 500 in more detail, the primary drive system 560 includes a conveyor belt 566, a pair of belt support rollers 562, 564, and an actuator 568 (e.g., an electric belt drive motor) corresponding to the components 166, 162, 164, and 168, respectively.

The secondary drive system 580 includes an axle 582, a pair of opposed, offset pincher or transport wheels 584, 586, an actuator 588 (e.g., an electric motor), and a guidance, director or separator bar 589. The axle 582 is mounted in the housing 510 for rotation with respect thereto about a rotation axis R-R. The wheels 584, 586 are mounted on and affixed to the axle 582 for rotation therewith. The actuator 588 is operatively connected to the axle 582 to forcibly drive the axle 582 (and thereby the wheels 584, 586) about the rotation axis R-R.

Figure 17:
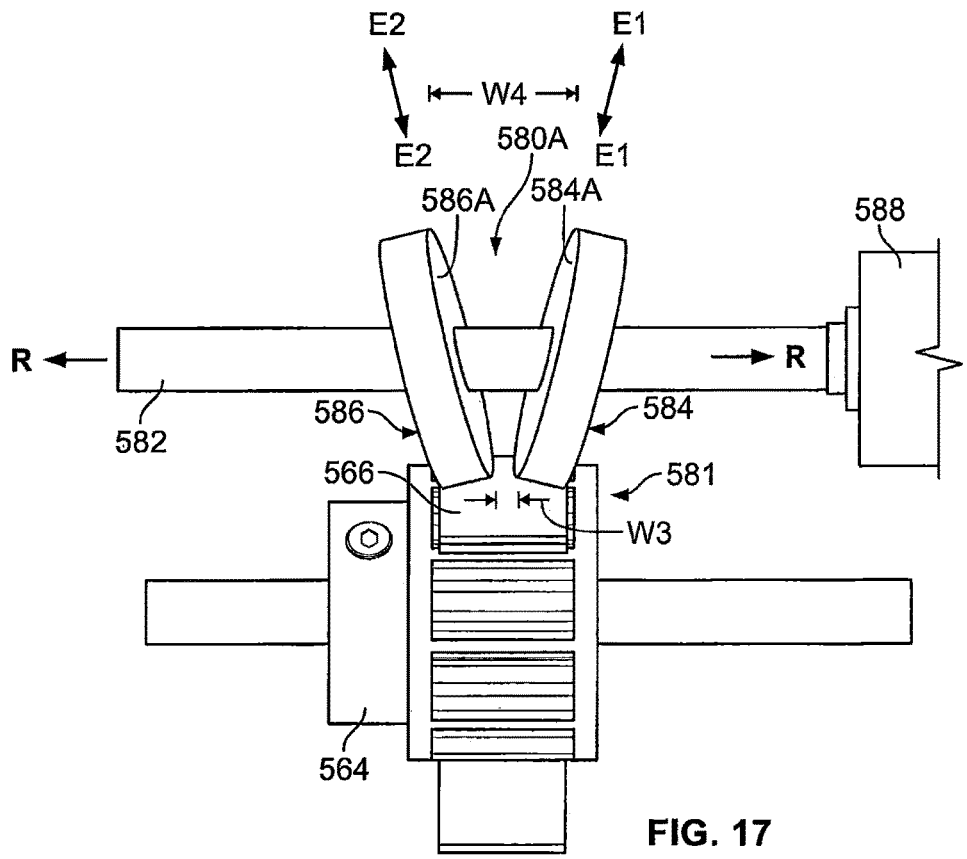
FIG. 17 is a fragmentary, cross-sectional view of the dispensing bin of FIG. 14 taken along the line 17-17 of FIG. 16.

With reference to FIG. 17, the wheels 584 and 586 have inner, opposing engagement faces 584A and 586A. According to some embodiments, the faces 584A, 586A define engagement planes E1-E1 and E2-E2, respectively, and the planes E1-E1 and E2-E2 are non-parallel (i.e., extend transversely to one another). According to some embodiments, at least one (in some embodiments both, as illustrated) of the planes E1-E1, E2-E2 extends obliquely with respect to the rotation axis R-R. That is, the engagement faces 584A and 586A are disposed at an angle with respect to one another and one or both of the engagement faces 584A and 586A are disposed at a non-perpendicular angle with respect to the rotation axis R-R. The engagement faces 584A and 586A define an annular tablet receiving gap or slot 580A therebetween. The width of the slot 580A (i.e., the distance between the engagement faces 584A and 586A) varies about its circumference from a minimum width W3 to a maximum width W4. According to some embodiments, the width of the slot 580A varies uniformly from the minimum width W3 to the maximum width W4. According to some embodiments, the minimum width W3 is in the range of from about 1/16 inch to 1/8 inch. According to some embodiments, the maximum width W4 is in the range of from about 4/8 inch to 5/8 inch.

The wheels 584, 586 may be formed of any suitable material or materials. According to some embodiments, the engagement faces 584A, 586A are formed of a material suitable for temporarily holding and frictionally engaging the tablets T. According to some embodiments, the engagement faces 584A, 586A are formed of a polymer. According to some embodiments, the engagement faces 584A, 586A are formed of an elastomeric material. According to some embodiments, the engagement faces 584A, 586A are formed of an open cell foam. According to some embodiments, each of the engagement faces 584A, 586A is formed as a multilayer disc or wafer with different layers of the wheel having different properties. In some embodiments, the wheels 584, 586 are formed of or include a compressible layer, which may be formed of foam rubber, for example. According to some embodiments, each wheel 584, 586 includes an engagement layer and a support layer or backing substrate outside the engagement layer, and the support layer has a greater stiffness than the engagement layer. For example, the support layer may be formed of a relatively hard plastic material while the engagement layer is formed of rubber.

The separator bar 589 may be integral with the housing 510. The separator bar 589 extends into the slot 580A and has an inner end 589A proximate the axle 582 and an outer end proximate the nozzle passage 530A of the nozzle 530. The nozzle passage 530A leads to or communicates with an outlet 530B.

Figure 18:
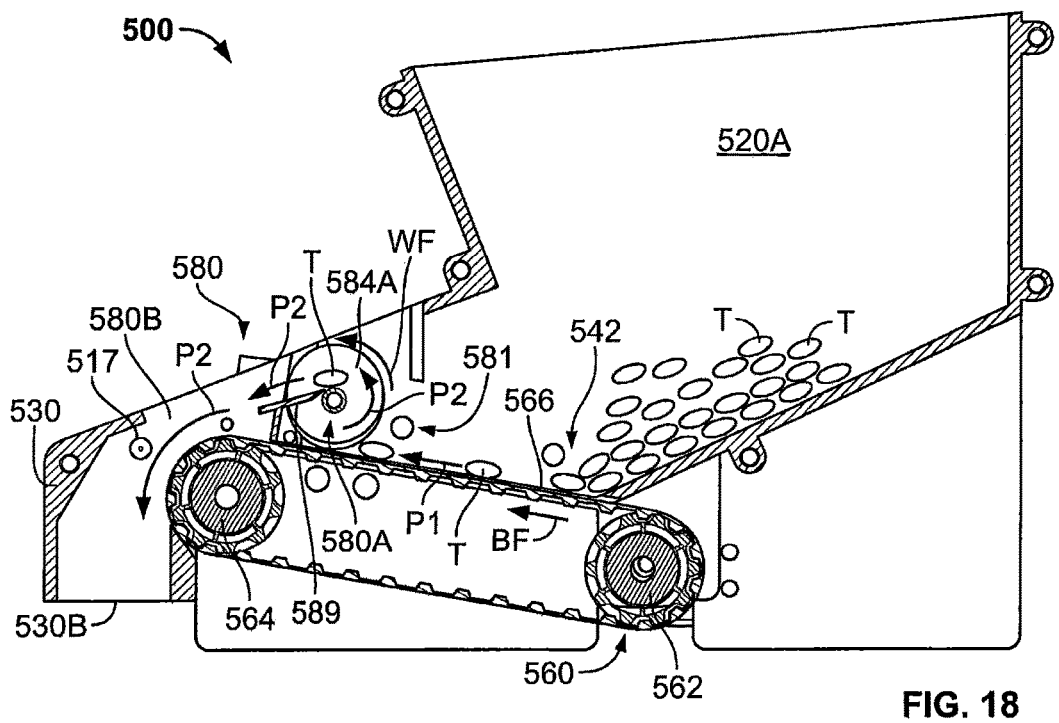
FIG. 18 is a cross-sectional view of the dispensing bin of FIG. 14 illustrating operations thereof.

With reference to FIG. 18, in use, a controller 574 (FIG. 14; e.g., corresponding to the controller 174) operates the actuators 568 and 588 to deliver the tablets T from the hopper chamber 520A to the nozzle passage 530A. More particularly, the actuator 568 is actuated by the controller 574 to drive the belt 566 in a forward direction BF and thereby convey the tablets T from the staging region 542 to the staging region 581 along a path P1. The actuator 588 is actuated by the controller 574 to rotate the axle 582 (and thereby the wheels 584, 586) in a forward direction WF.

The tablets T are thereby presented to the tablet receiving slot 580A of the rotating wheels 584, 586, and the wheels 584, 586 then pick up the tablets T one by one. More particularly, a tablet T is fed into the slot 580A at a portion of the slot 580A that is wider than the width of the tablet T so that the wheels 584, 586 slide past the tablet T and the tablet T remains on or proximate the belt 566 in the staging region 581. However, as the offset wheels 584, 586 continue to rotate in the direction WF, the portion of the slot 580A occupied by the tablet T narrows until it is narrow enough to grab and pick up the tablet T. The wheels 584, 586 then carry the tablet T up and over the axle 582 (along a path P2) where the tablet T is dislodged or separated from the wheels 584, 586 by the separator bar 589 and directed by the separator bar 589 to the nozzle passage 530A.

The secondary drive system 580 can thus pick up and drop the tablets T one at a time to be counted downstream of the staging region 581 (e.g., in the nozzle 530). The drive systems 560, 580 can restrict or singulate tablets T without requiring adjustment. The varied width of the slot 580A can accommodate tablets T of a range of different sizes.

The drive systems 560 and 580 may be cooperatively and independently controlled (e.g., with two independent control loops). In some embodiments, the actuator 568 is controlled and driven (e.g., by the controller 574) as needed to provide an amount or number of tablets T to the staging region 581 in a desired or prescribed range, and the actuator 588 is controlled and driven to singulate and to dispense the desired number of tablets through the nozzle 530. For example, a sensor 515 may be provided at the staging region 581 to detect the presence of tablets T at the staging region 581 and the actuator 568 may be used to convey tablets T from the staging region 542 to the staging region 581 as needed to resupply the staging region 581. A further sensor 517 can be provided downstream of the wheels 584, 586 to detect the tablets T dispensed and the controller 574 can control the actuator 588 to start and stop the actuator 588 to dispense the requested number of tablets T.

Figure 19:
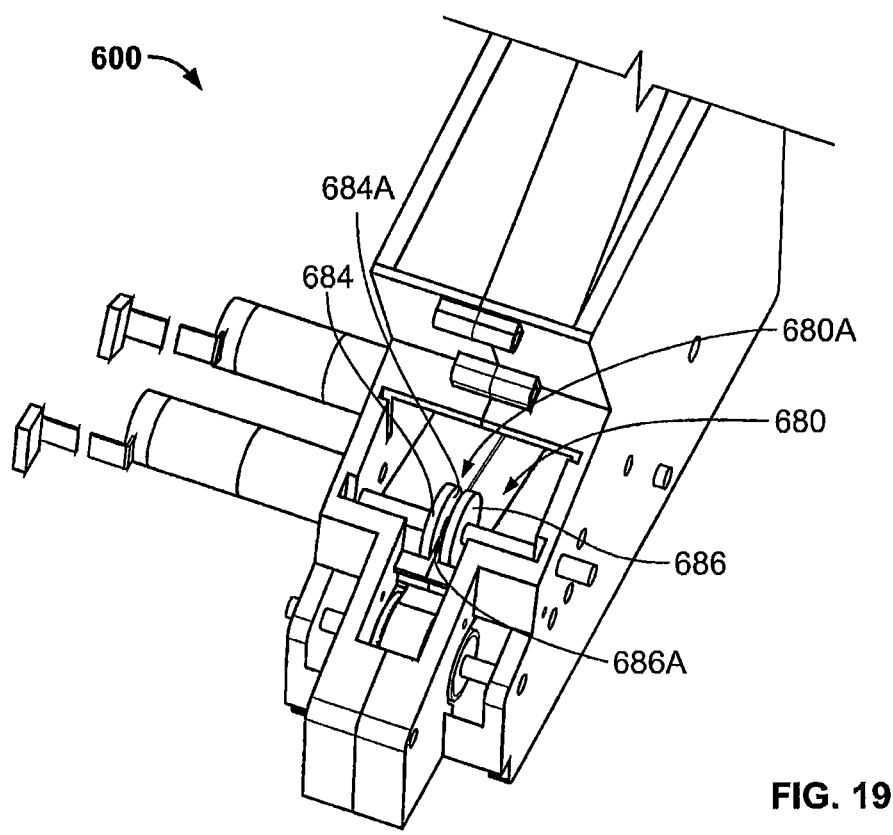
FIG. 19 is a front perspective view of a dispensing bin according to further embodiments.
Figure 20:
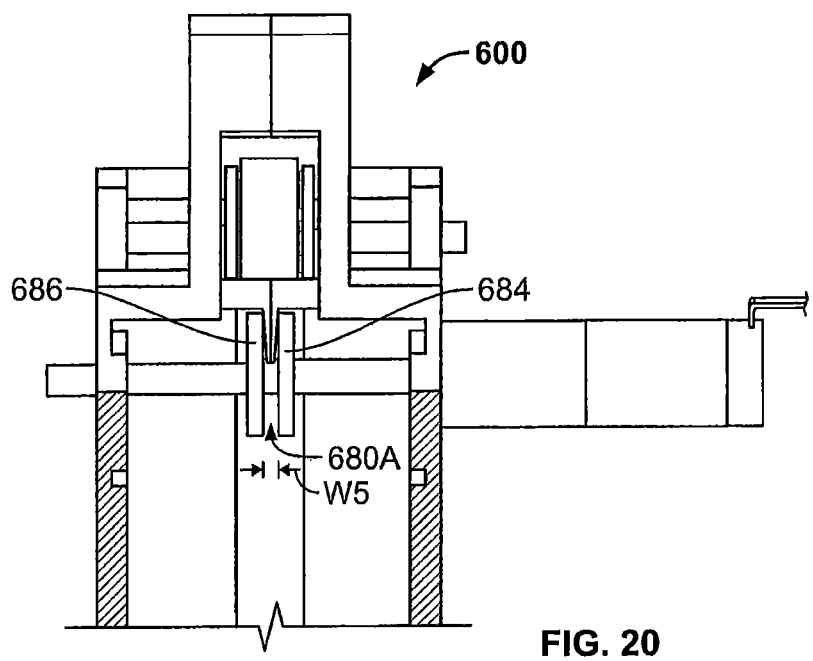
FIG. 20 is a fragmentary, top view of the dispensing bin of FIG. 19.

With reference to FIGS. 19 and 20, a bin 600 according to further embodiments of the invention is shown therein. The bin 600 corresponds to the bin 500 except that the secondary drive system 680 of the bin 600 employs transport wheels 684 and 686 having substantially parallel opposed engagement surfaces 684A, 686A rather than offset wheels. Thus the tablet receiving slot 680A has a substantially uniform or constant width W5.

Figure 21:
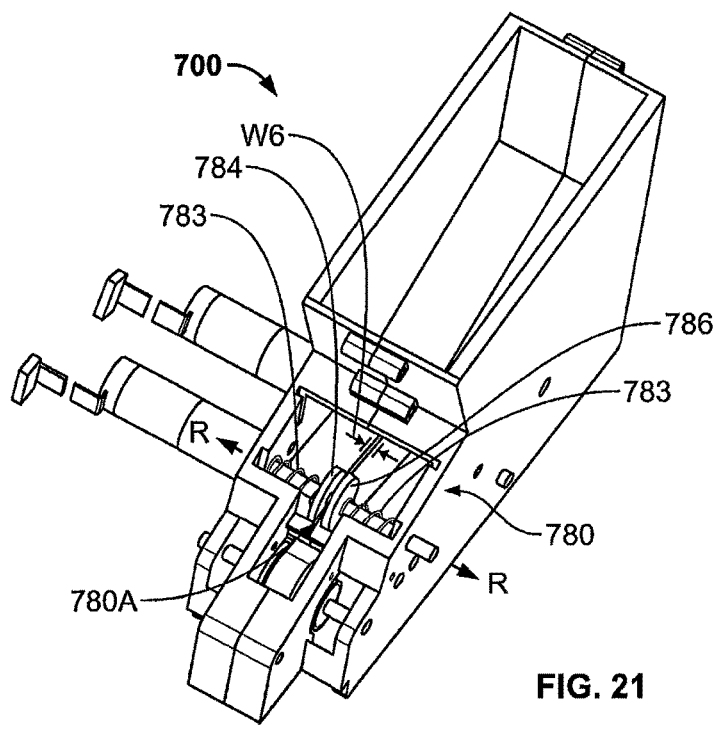
FIG. 21 is a front perspective view of a dispensing bin according to further embodiments and which may form a part of the tablet dispensing system of FIG. 1.

With reference to FIG. 21, a bin 700 according to further embodiments of the present invention is shown therein. The bin 700 corresponds to the bin 600 except that the engagement wheels 784 and 786 of the bin 700 are mounted on the axle 782 to permit relative translational displacement of the wheels 784 and 786 along the rotation axis R-R. Biasing mechanisms 783 (e.g., coiled springs) are provided to bias the wheels 784 and 786 toward one another. In this manner, the width W6 of the tablet receiving slot 780A can be dynamically varied. According to further embodiments, the bin 500 may be modified to include biasing mechanisms corresponding to the biasing mechanisms 783 to bias the wheels 584 and 586 toward one another.

With reference to FIGS. 22-31, a bin 800 according to further embodiments of the present invention is shown therein. The bin 800 may be used in place of the bin 100. The bin 800 corresponds generally to the bin 100, but differs in that the singulating wall 144 is replaced with a singulating gate system 880. Generally, a tablet drive system 860 (constructed and operable in the same or similar manner as the drive system 160) conveys tablets T in a direction BF along a dispensing path P (FIG. 23) from a staging region 842 at the hopper chamber 820A, to a gate opening 844 and through the gate opening 844 to the nozzle passage 830A of the nozzle 830. The conveyed tablets T are thereby dispensed through the nozzle outlet 830B. At the gate opening 844, the tablets T are singulated so that the tablets T pass one at a time through the gate opening 844 and into the nozzle passage 830A. Singulating the tablets in this manner can improve reliability and accuracy in detecting and counting the dispensed tablets T (e.g., using a photodetector 872B (FIGS. 22 and 25)). The singulating gate system 880 is selectively adjustable to change and set the dimensions of the gate opening 844 as desired. In particular, the size of the gate opening 844 can be adjusted to a size appropriate for singulating the given tablets T in the hopper 820A.

Turning to the bin 800 in more detail, the drive system 860 includes a conveyor belt 866, a pair of belt support rollers 862, 864, and an actuator 868 (e.g., an electric belt drive motor) corresponding to the components 166, 162, 164 and 168, respectively. The belt 866 travels along a bin drive axis L-L.

Figure 23:
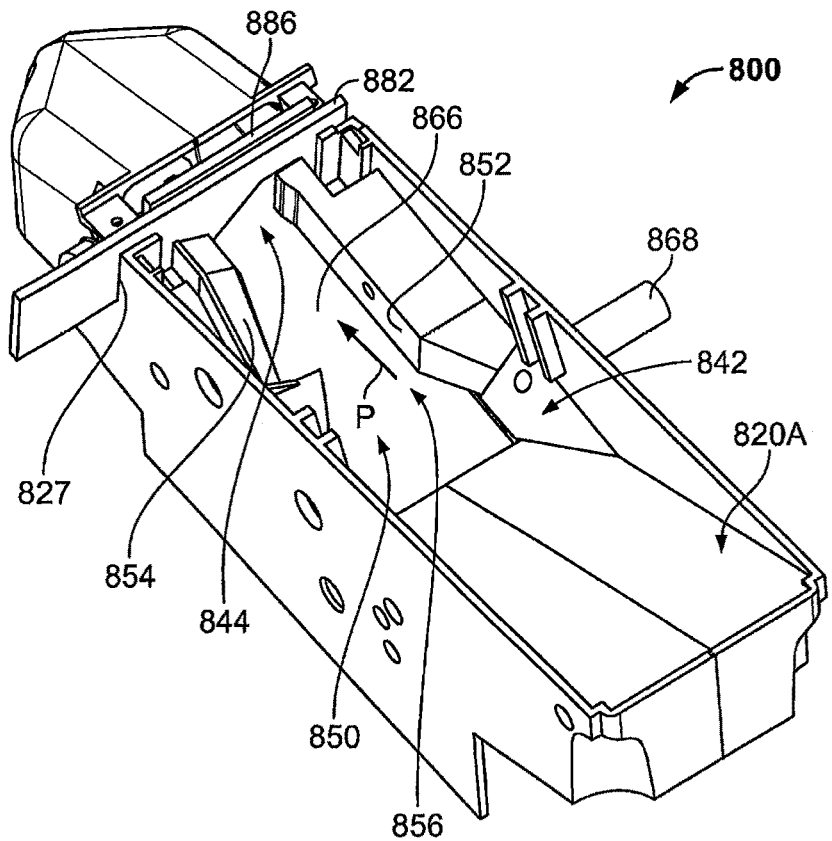
FIG. 23 is a fragmentary, rear perspective view of the dispensing bin of FIG. 22.
Figure 24:
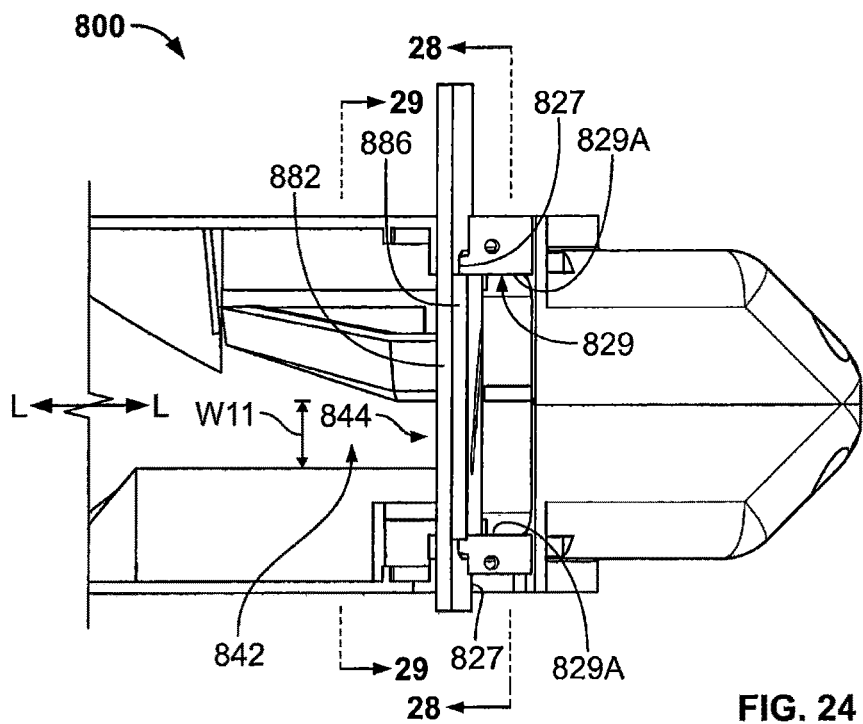
FIG. 24 is a fragmentary, top view of the dispensing bin of FIG. 22.
Figure 25:
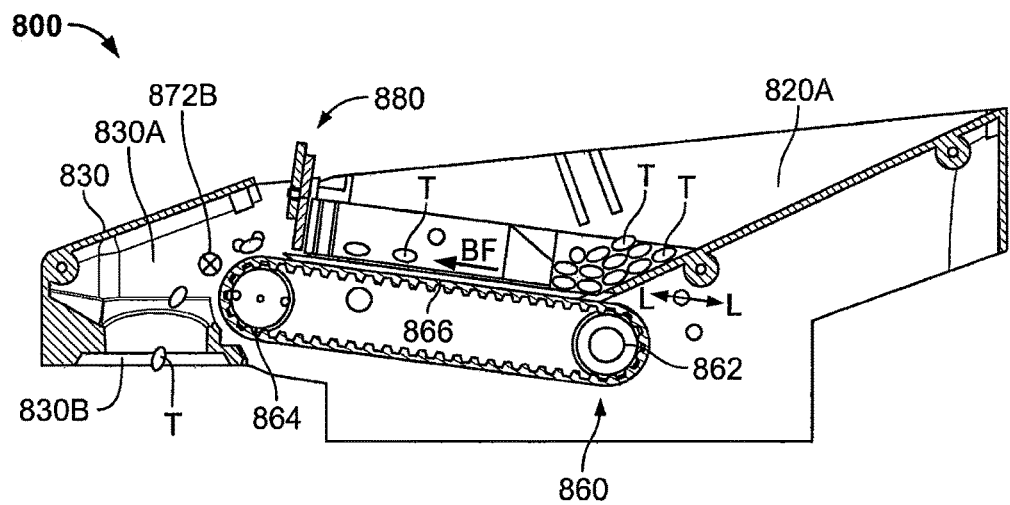
FIG. 25 is a cross-sectional view of the dispensing bin of FIG. 22.
Figure 26:
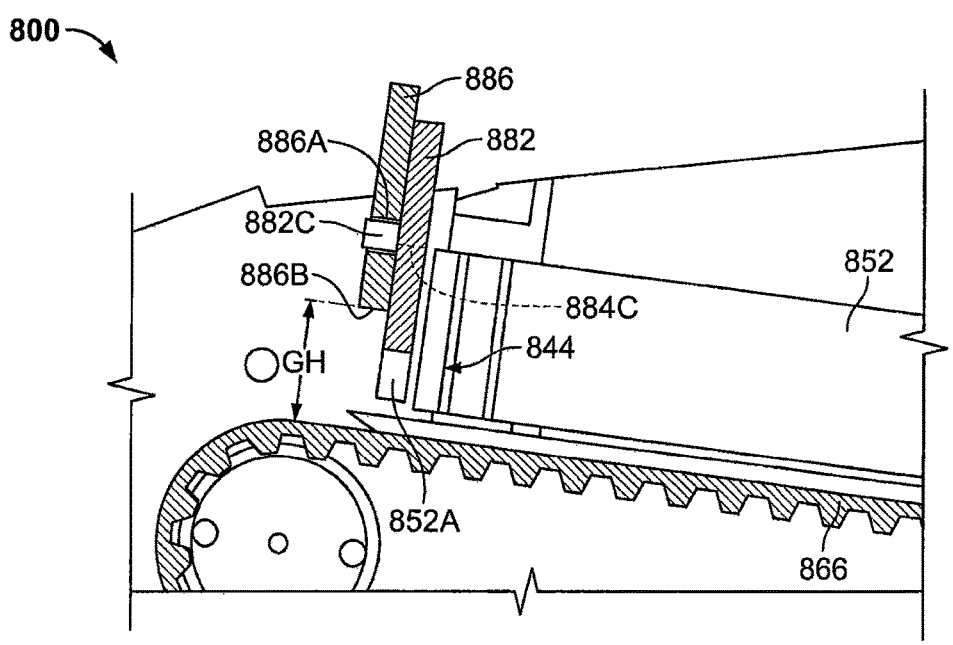
FIG. 26 is an enlarged, fragmentary, cross-sectional view of the dispensing bin of FIG. 22.

Laterally opposed sidewalls or singulating baffles 852 and 854 define the guide channel 856 (FIG. 23). As discussed below, the right side baffle 852 may be stationary and the left side baffle 854 forms a part of a first gate member 882, which forms a part of the gate system 880. The guide channel 856 and the gate opening 844 define a dispensing channel 850, which effectively defines the dispensing path P.

The gate system 880 includes a pair of opposed, transversely extending slots 827, a vertically extending slot 829, the first gate member 882 and a second gate member 886. With reference to FIGS. 24 and 28-31, the gate member 882 is mounted in the slots 827 such that the gate member 882 can be forcibly slid along a horizontal gate member axis N-N in each of a left direction Q and an opposing right direction R. The gate member 886 is slidably mounted in the slot 829 such that the gate member 886 can be slid along a vertical gate member axis M-M in each of an upward direction U and a downward direction D. The gate member 886 is constrained from lateral (i.e., leftward and rightward) movement by the sidewalls 829A defining the slot 829.

Figure 27:
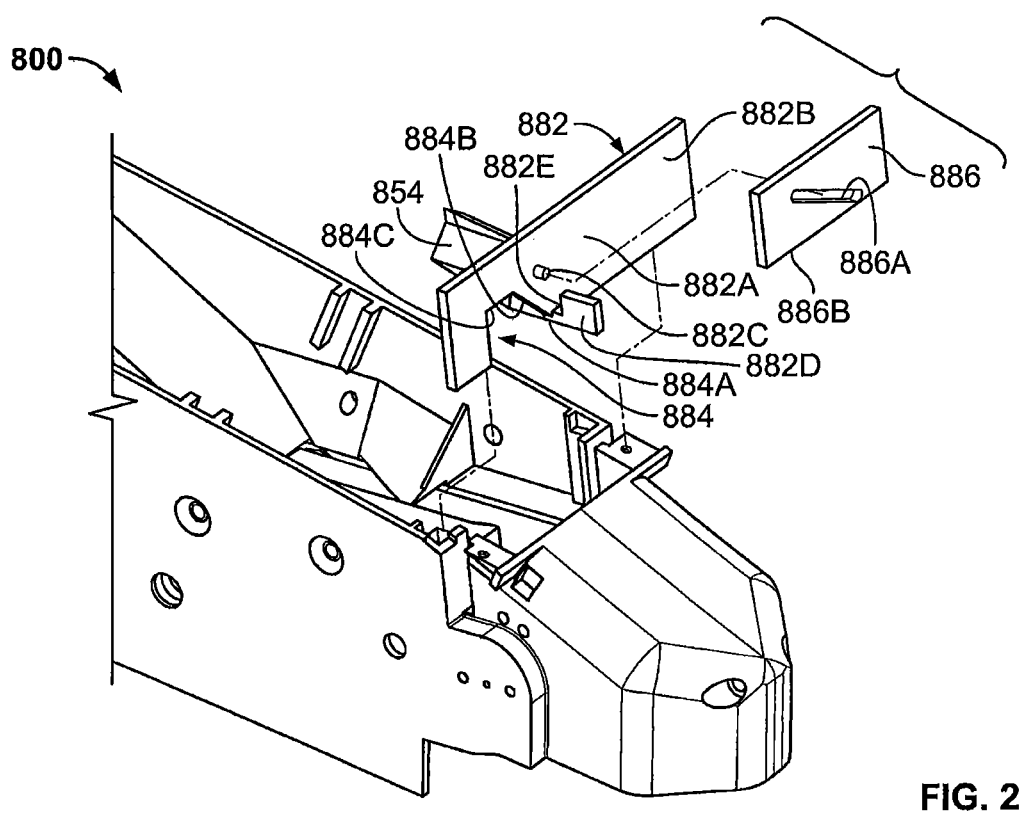
FIG. 27 is an exploded, fragmentary, front perspective view of the dispensing bin of FIG. 22.

With reference to FIG. 27, the gate member 882 includes a body 882A and a handle 882B. In use, the handle 882B can be used to manipulate the gate member 882 and force the gate member 882 to slide along the axis N-N. However, other features and mechanisms may be provided for positioning the gate member 882.

Figure 28:
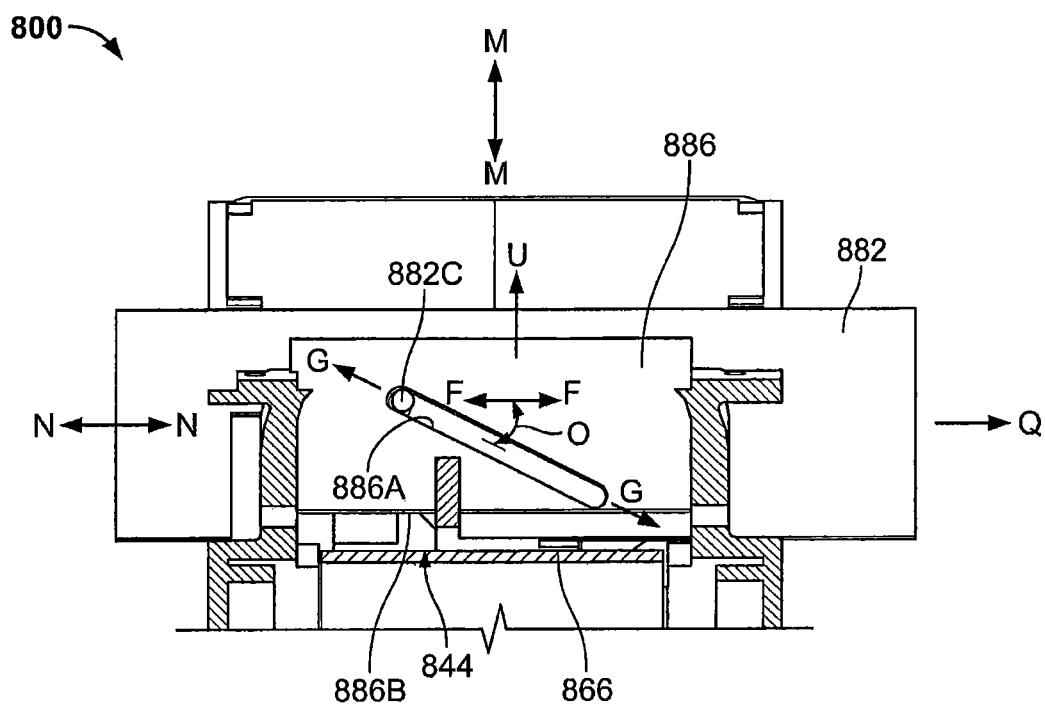
FIG. 28 is a fragmentary, front cross-sectional view of the dispensing bin of FIG. 22 taken along the line 28-28 of FIG. 24 with a gate system thereof in a first position.

The gate member 882 further includes a guide feature, protrusion, pin or peg 882C, a support ledge 882D (defining a slot 882E), and the left baffle 854 all integral with the body 882A. A downwardly opening cutout 884 is defined in the body 882A by a first (vertical) edge 884A (FIG. 31), a second (diagonal) edge 884B, and a third (top, horizontal) edge 884C. According to some embodiments, the diagonal edge 884B forms an angle of about 35 to 55 degrees and, in some embodiments, about 45 degrees with respect to the belt 866. When the gate member 882 is translated along the axis N-N, the guide peg 882C travels along an axis F-F (FIG. 28).

The second gate member 886 (FIG. 27) includes a through slot 886A having a guide slot axis G-G extending diagonally and transversely to the vertical gate member axis M-M, the horizontal gate member axis N-N, and the bin drive axis L-L. According to some embodiments, the slot axis G-G forms an angle O with the axis F-F (FIG. 28). The gate member 886 has a lower edge 886B.

The gate members 882, 886 may be formed of any suitable material or materials. According to some embodiments, the gate members 882, 886 are formed of materials as described above for the housing 110.

As noted above, the gate member 882 is mounted in the slots 827 over the belt 866. The gate member 886 is mounted in the slot 829 such that the lower edge 886B is slidably seated in the support slot 882E and the guide peg 882C is interlocked with and slidably seated in the guide slot 886A. When the gate system 880 is assembled in the housing 810, the gate opening 844 is defined by the lower edge 886B, the cutout edges 884A, 884B, an edge 852A of the right side baffle 852, and the belt 866.

In use, in order to adjust the dimensions of the gate opening 844, the gate member 882 is slid along the axis N-N to enlarge and reduce the size of the gate opening 844, depending on the direction of travel. As the gate member 882 is slid, the guide peg 882C acts on the gate member 886 via the slot 886A to raise and lower the gate member 886 (and thereby the lower edge 886B) in the slot 829. In this manner, the operator can adjust the width GW of the gate opening 844 (by directly repositioning the edges 884A, 884B) and also automatically adjust the height GH of the gate opening 844 by indirectly repositioning the lower edge 886B.

Figure 29:
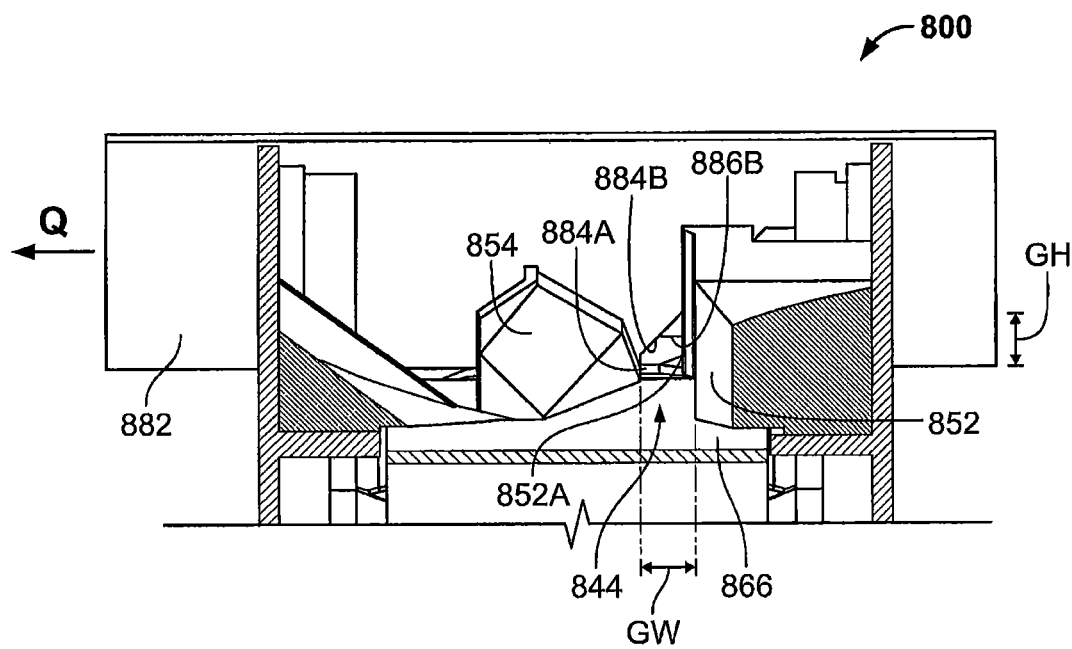
FIG. 29 is a fragmentary, rear cross-sectional view of the dispensing bin of FIG. 22 taken along the line 29-29 of FIG. 24 with the gate system in the first position.
Figure 30:
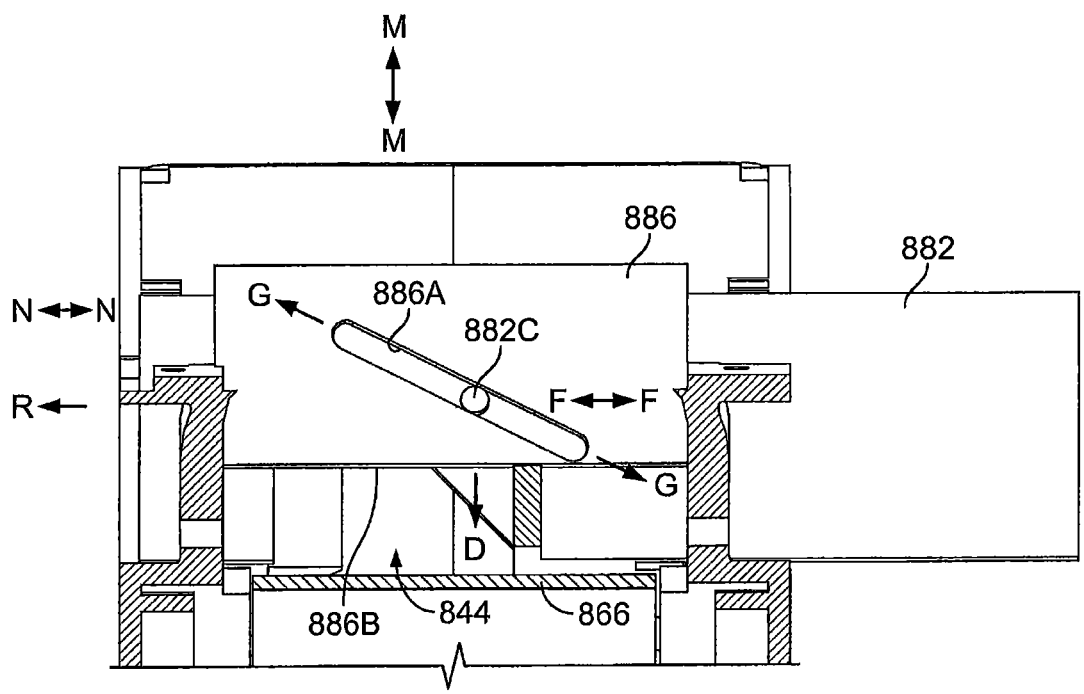
FIG. 30 is a fragmentary, front cross-sectional view of the dispensing bin of FIG. 22 taken along the line 28-28 of FIG. 24 with a gate system thereof in a second position.
Figure 31:
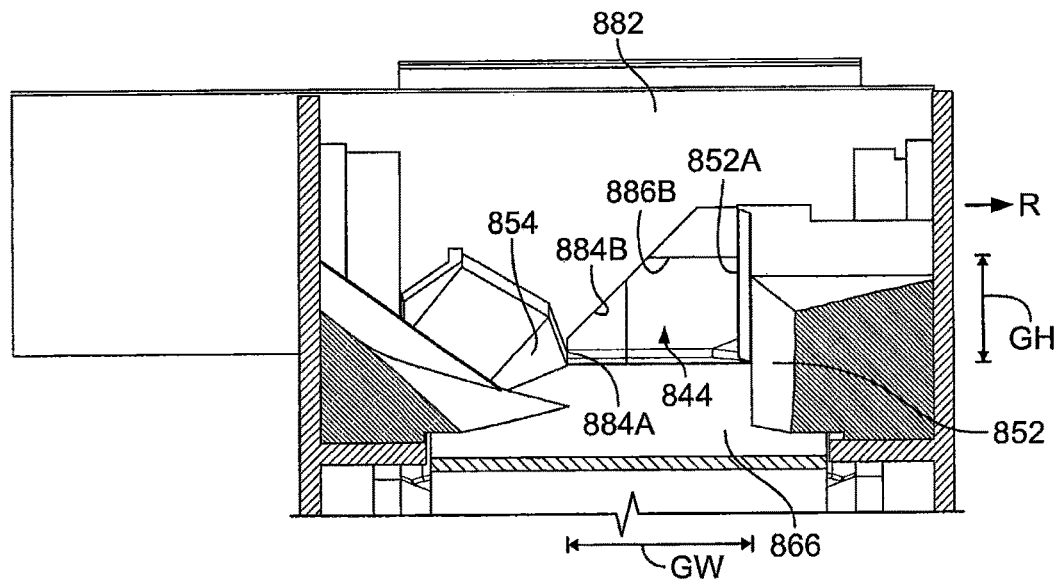
FIG. 31 is a fragmentary, rear cross-sectional view of the dispensing bin of FIG. 22 taken along the line 29-29 of FIG. 24 with the gate system in a second position.

Exemplary operation of the gate system 880 will now be described with reference to FIGS. 28-31. The gate opening 844 can be transitioned from the relatively small size as shown in FIGS. 28 and 29 to the relatively larger size as shown in FIGS. 30 and 31 by pulling or otherwise displacing the gate member 882 in the direction Q (FIG. 28) along the axis N-N. The fixed guide peg 882C will slide in the same direction along a guide peg axis F-F parallel to the horizontal axis N-N so that the laterally constrained gate member 886 is pushed in the upward direction U along the axis M-M.

Similarly, the gate opening 844 can be transitioned from the larger size of FIGS. 30 and 31 to the smaller size of FIGS. 28 and 29 by sliding the gate member 882 in a direction R (FIG. 30) along the axis N-N so that the interaction of the guide peg 882C and the guide slot 886B pushes the gate member 886 in a downward direction D. The lowered gate member 886 shuts off open space above the required opening in the cutout 884.

Notably, the baffle 854 is affixed to the gate member 882 for movement therewith. As a result, adjustment of the gate member 882 causes the baffle 854 to slide over the belt 866 and likewise adjust the effective width W11 (FIG. 24) of the guide channel 856.

As will be appreciated from the foregoing description, the gate width GW and the gate height GH are interdependent and the gate height GH will automatically vary as a function of the gate width GW. According to some embodiments, the ratio of the gate width GW to the gate height GH (GW:GH) is substantially fixed.

According to some embodiments, the gate width GW is greater than the gate height GH throughout a range of operational settings and, in some embodiments, the gate width GW is always greater than the gate height GH. According to some embodiments, the ratio GW:GH is about 2:1 (with a guide slot angle O (FIG. 28) of about 45 degrees).

In some embodiments, the gate width GW is set to [tablet width+tablet height+a prescribed tolerance/gap width], and the gate system 880 is configured such that the gate height GH is maintained at a prescribed fraction (e.g., ½) of the gate width GW plus a prescribed tolerance/gap width.

As illustrated, the guide slot 886A may be linear to provide a substantially constant or uniform ratio GW:GH. The angle O of the guide slot 886A may be changed to provide a greater or lesser ratio between the gate width GW and the gate height GH. According to some embodiments, the guide slot 886A can be formed as a non-linear (e.g., curved) slot so that the ratio GW:GH will vary as the gate member 882 moves along the axis N-N. For example, a larger tolerance/gap can be provided for larger pills while keeping a smaller tolerance/gap for smaller pills.

Because the cutout edge 884B is obliquely angled with respect to the top edge 884C and the belt 866 (e.g., at about 45 degrees), the gate height GH can be set at [tablet width+tablet height].

By automatically configuring the gate opening 844 so that the gate width GW is greater than the gate height GH for any size in the operating range, the gate system 880 can ensure that the tablets T that pass through the gate opening 844 are lying down and not standing on edge or end. In particular, round pills standing on edge will be prevented from rolling through the gate opening 844 by the relatively low gate height GH. That is, only tablets T disposed on their "flat" side will pass through the gate opening 844. By passing through only tablets T oriented in this manner, the gate system 880 can reduce or eliminate dispensing problems associated with rolling tablets T and provide improved engagement between the tablets T and the belt 866 downstream of the gate opening 844.

In use, the operator can set the gate system 880 so that the gate width GW is appropriate for the size and shape of the tablet T. For example, for a flat, round pill (i.e., the pill having a greater diameter than thickness) the gate width GW is set to match the pill diameter plus a desired tolerance to prevent a tablet from rolling through the gate opening 844. For an elongate capsule (e.g., having a length greater than its diameter or height and width), the gate width GW may be set to match the capsule diameter, height or width plus a desired tolerance to prevent capsules from passing through the gate opening 844 in side-by-side relation.

By adjusting both the gate width GW and the gate height GH using a single adjustment input (i.e., sliding the gate member 882 along the axis N-N), the desired relationship between the gate width GW and the gate height GH can be maintained and operation can be simplified.

While a handle 882B is shown and described for applying adjustment inputs to the gate system 880, other mechanisms may be employed. For example, a rotatable adjustment knob or the like may be provided with a screw thread or cam and configured (directly or through a linkage) to push or pull the gate member 882 in the directions Q and R by rotating the knob in corresponding directions.

According to some embodiments, the gate system 880 is selectively adjustable using an electronically controlled actuator such as a solenoid or electric motor.

Figure 22:
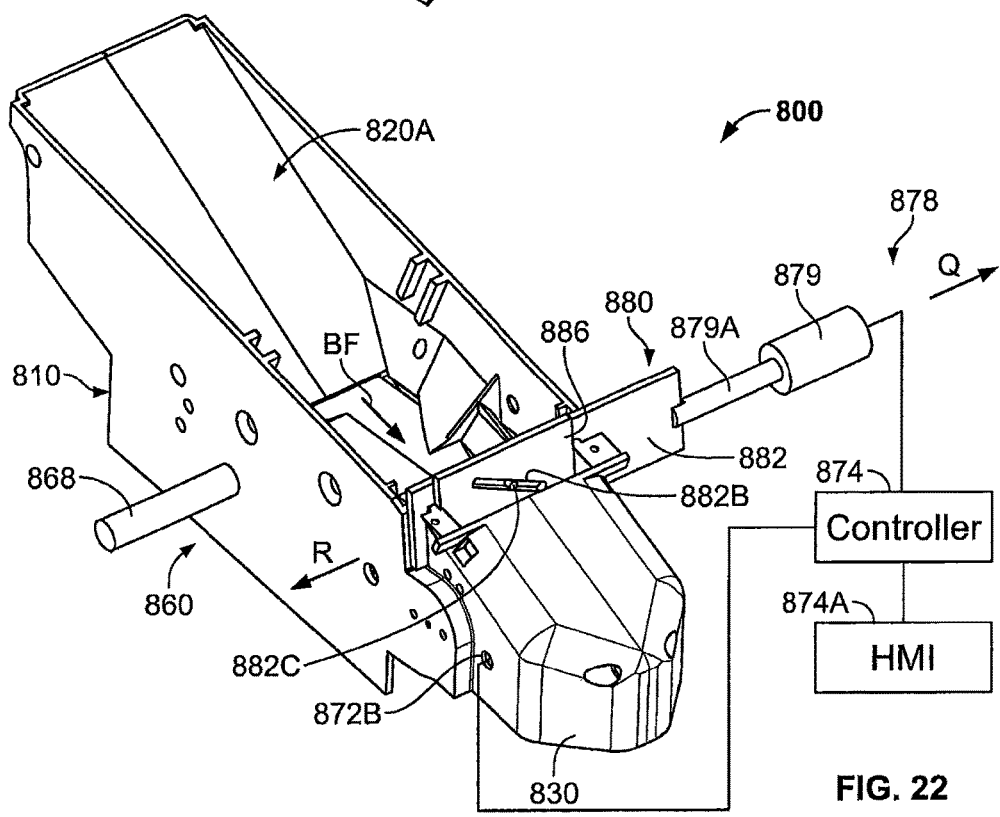
FIG. 22 is a fragmentary, front perspective view of an alternative tablet drive and guide system according to further embodiments of the present invention and which may form a part of the tablet dispensing system of FIG. 1.

With reference to FIG. 22, the bin 800 is shown therein further including an optional electronic control system 878. The system 878 includes an electronically controlled actuator 879, a controller (e.g., the controller 874), and a tablet detector (e.g., the photodetector 872B).

The actuator 879 may be, for example, a solenoid or electric motor directly or indirectly coupled to the gate member 882 to move the gate member 882 along the axis N-N. For example, in the illustrated embodiment, the actuator 879 is a two-way solenoid having a shaft 879A that the solenoid can forcibly extend and retract to push and pull the gate member 882 along the axis N-N. However, this arrangement is merely exemplary and other suitable configurations and mechanisms may be employed and the actuator may be integrally mounted on the bin housing 810 or a separate or separable unit.

The controller 874 is electrically connected to the detector 872B to receive the tablet detection signals therefrom. The controller 874 is electrically connected to the actuator 879 to provide control signals thereto.

In some embodiments, the actuator 879 can be used to effect a selected gate position. A human machine interface (HMI) 874A may be provided for the operator to input commands. In some embodiments, the controller 874 automatically and programmatically controls the actuator 879 to adjust the size of the gate opening 844. According to some embodiments, the controller 874 uses the detection signals from the detector 872B to control the actuator 879. According to some embodiments, the detector 872B and the detection signals provide a feedback loop to the controller 874. The controller 874 may set the gate position based on information from a database about the type of pill/tablet to be dispensed from the bin (e.g., pill dimensions).

According to some embodiments, the system 878 provides a self-calibration mode for adjusting the gate opening 844 to an appropriate size corresponding to the size of the given tablets T in the hopper chamber 820A. In the self-calibration mode, the system 878 initially positions the gate system 880 in a first or start position wherein the gate opening 844 has a first relatively small size configuration. The start position may be the position providing the smallest size that can be assumed by the gate opening 844 (e.g., as shown in FIGS. 29 and 30). The start size 844 should be small enough to block any tablet T within the intended range of the bin 800 from passing through the gate opening 844.

The drive system 860 is then used to drive the tablets forward against the gate member 882 (e.g., by actuating the actuator 868 to drive the belt 866 in the forward direction). With the tablets T being driven forward, the controller 874 then operates the actuator 879 to gradually or incrementally and relatively slowly open the gate opening 844 wider while also monitoring the detector 872B for tablet detection signals. When the gate opening 844 is large enough to allow a properly oriented tablet T to pass therethrough, the passed tablet T will be detected by the detector 872B. The controller 874 will respond to the corresponding tablet detection signal from the sensor detector 872B by deactivating the actuator 879, thereby setting the size of the gate opening 844. In some embodiments, the controller 874 will command the actuator 879 to open the gate opening 844 slightly wider after the passed tablet T is detected in order to provide a margin or tolerance to facilitate freer flow of the singulated tablets T.

Because the gate system 880 provides dimensional adjustment of the gate opening 844 in two dimensions, it is only necessary to move the adjustment component (the gate member 882) along the one axis N-N. Accordingly, a single motor or other actuator is sufficient.

Calibration methods and an electronic gate control system having a self-calibration mode as described herein (e.g., the system 878) may be employed with gate systems of other designs.

With reference to FIGS. 32-40, a bin 900 according to further embodiments of the present invention is shown therein. The bin 900 may be used in place of the bin 100. The bin 900 corresponds generally to the bin 800, but differs in that the singulating gate system 880 is replaced with a singulating gate system 980 and the bin 900 is further provided with an active feed control system 990. Generally, a tablet drive system 960 (constructed and operable in the same or similar manner as the drive system 160) conveys tablets T in a direction BF along a dispensing path P (FIG. 34) from a staging region 942 proximate the hopper chamber 920A, to a gate opening 944 and through the gate opening 944 to the nozzle passage 930A of the nozzle 930. The conveyed tablets T are thereby dispensed through the nozzle outlet 930B. At the gate opening 944, the tablets T are singulated so that the tablets T pass one at a time through the gate opening 944 and into the nozzle passage 930A. As discussed above with regard to the singulating gate system 880, singulating the tablets in this manner can improve reliability and accuracy in detecting and counting the dispensed tablets T (e.g., using a photodetector 972B (FIG. 34)). The singulating gate system 980 is selectively adjustable to change and set the dimensions of the gate opening 944 as desired. In particular, the size of the gate opening 944 can be adjusted to a size appropriate for singulating the given tablets T in the hopper 920A.

Turning to the bin 900 in more detail, the drive system 960 includes a conveyor belt 966, a pair of belt support rollers 962, 964, and a belt drive actuator 968 (e.g., an electric belt drive motor) corresponding to the components 166, 162, 164 and 168, respectively. The belt 966 travels along a bin drive axis L-L. The belt drive actuator 968 drives the roller 962 via an endless transmission belt 968A.

Figure 36:
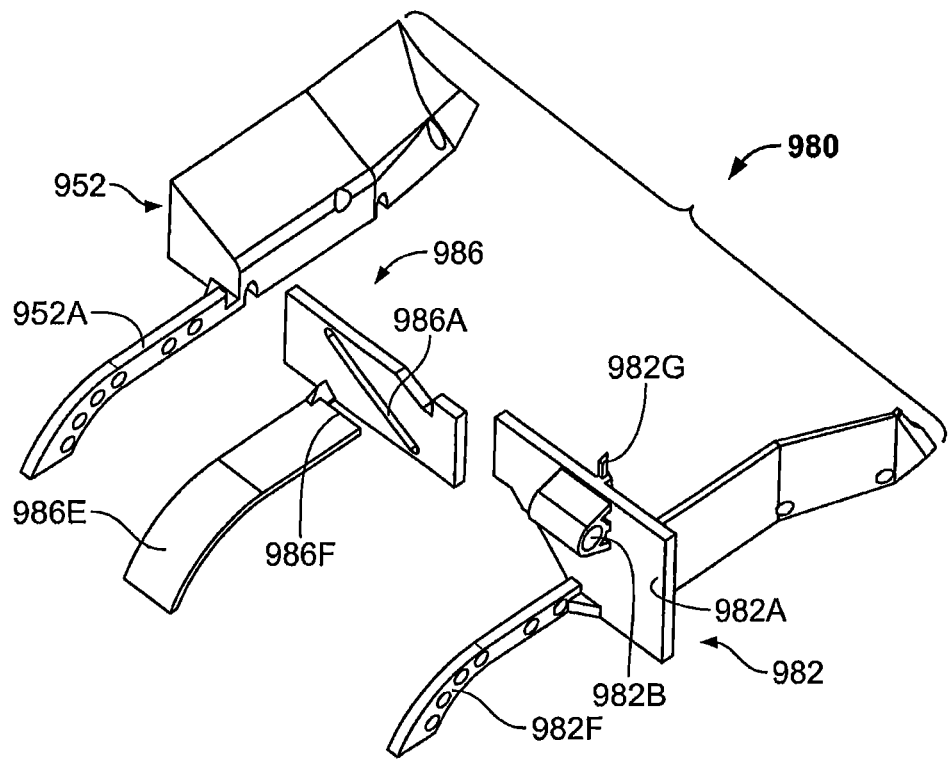
FIG. 36 is an exploded, front perspective view of a gate system forming a part of the dispensing bin of FIG. 32.
Figure 38:
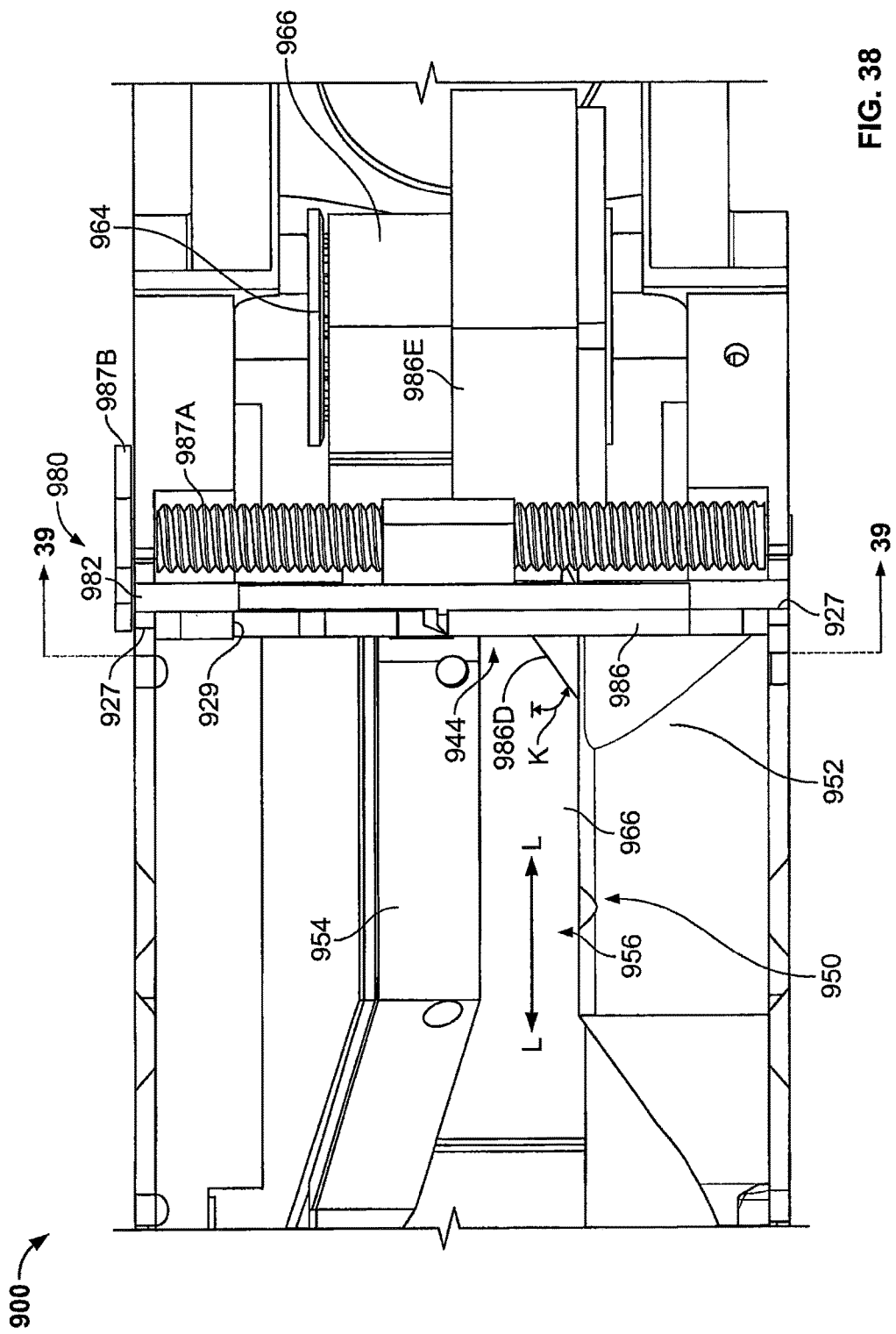
FIG. 38 is a fragmentary top view of the dispensing bin of FIG. 32.

Laterally opposed sidewalls or singulating baffles 952 (including an integral side guide wall 952A; FIG. 36) and 954 define the guide channel 956 (FIG. 38). As discussed below, the right side baffle 952 may be stationary and the left side baffle 954 forms a part of a first gate member 982, which forms a part of the gate system 980. The guide channel 956 and the gate opening 944 define a dispensing channel 950, which effectively defines the dispensing path P.

Figure 39:
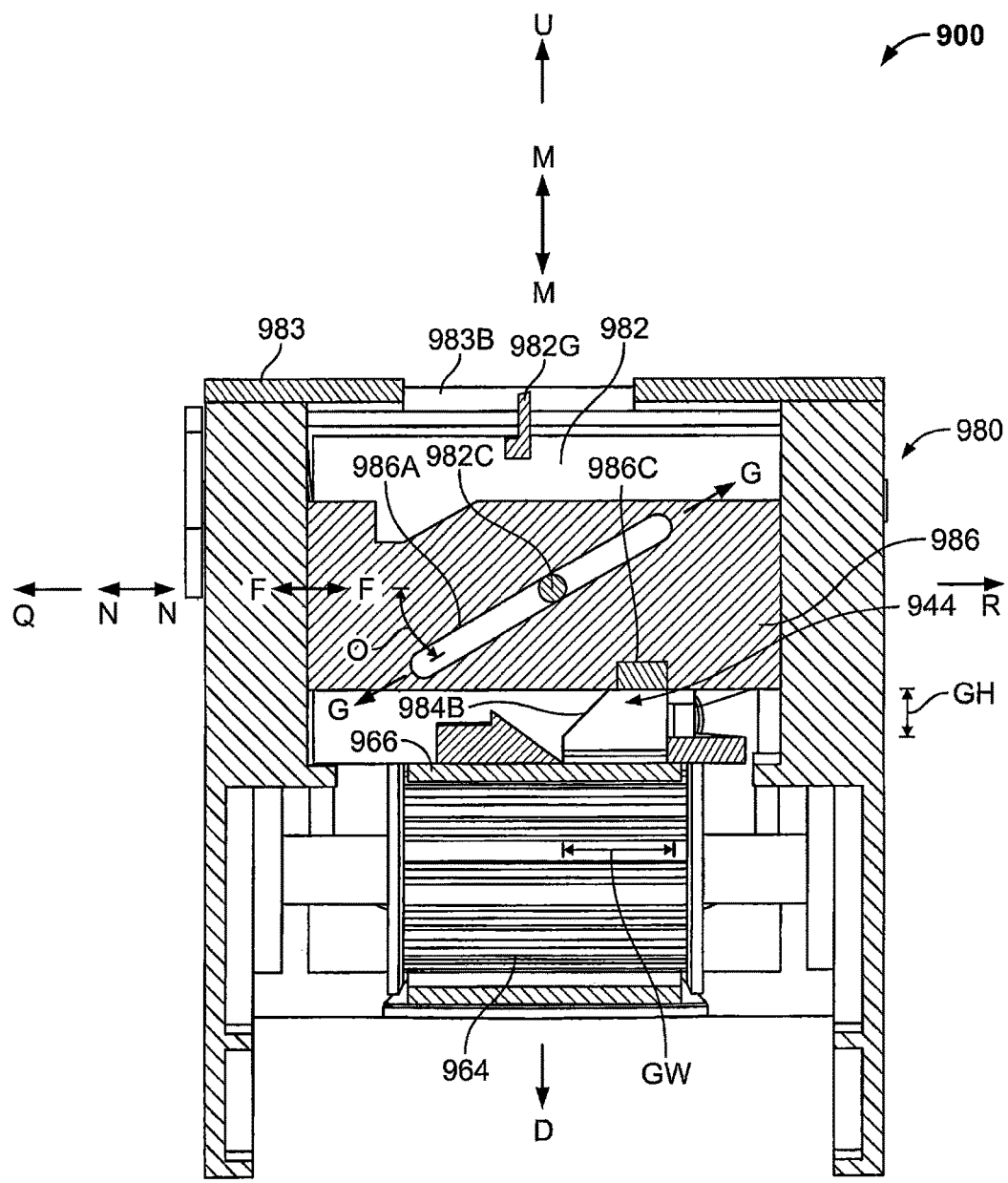
FIG. 39 is a rear cross-sectional view of the dispensing bin of FIG. 32 taken along the line 39-39 of FIG. 38.

The gate system 980 includes a pair of opposed, transversely extending slots 927, a vertically extending slot 929, the first gate member 982, a second gate member 986 and an adjustment control member 987. With reference to FIGS. 38 and 39, the gate member 982 is mounted in the slots 927 such that the gate member 982 can be forcibly slid along a horizontal gate member axis N-N in each of a left direction Q and an opposing right direction R. The gate member 986 is slidably mounted in the slot 929 such that the gate member 986 can be slid along a vertical gate member axis M-M in each of an upward direction U and a downward direction D. The gate member 986 is constrained from lateral (i.e., leftward and rightward) movement by the sidewalls defining the slot 929.

Figure 33:
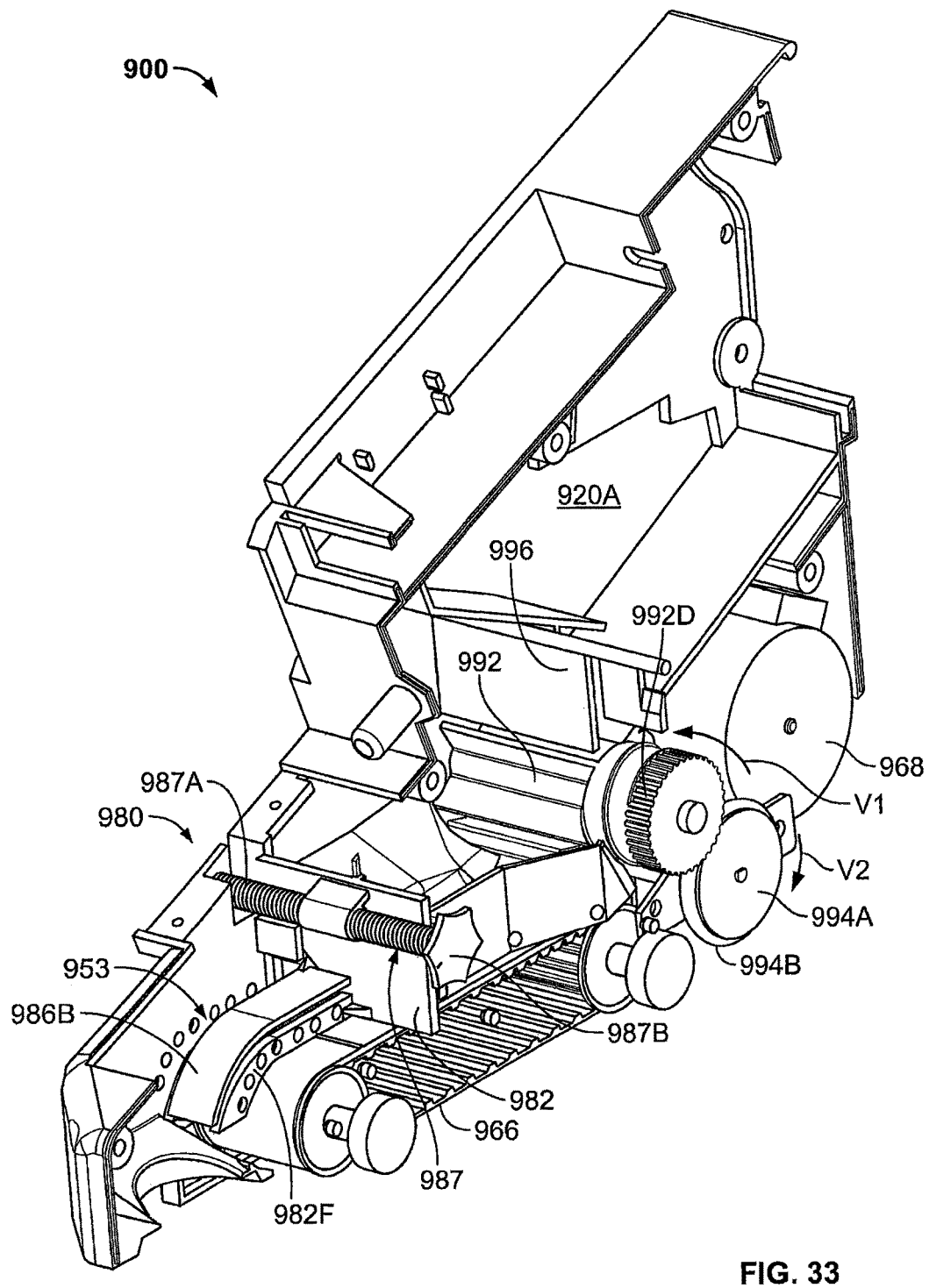
FIG. 33 is a fragmentary, front perspective view of the dispensing bin of FIG. 32.
Figure 37:
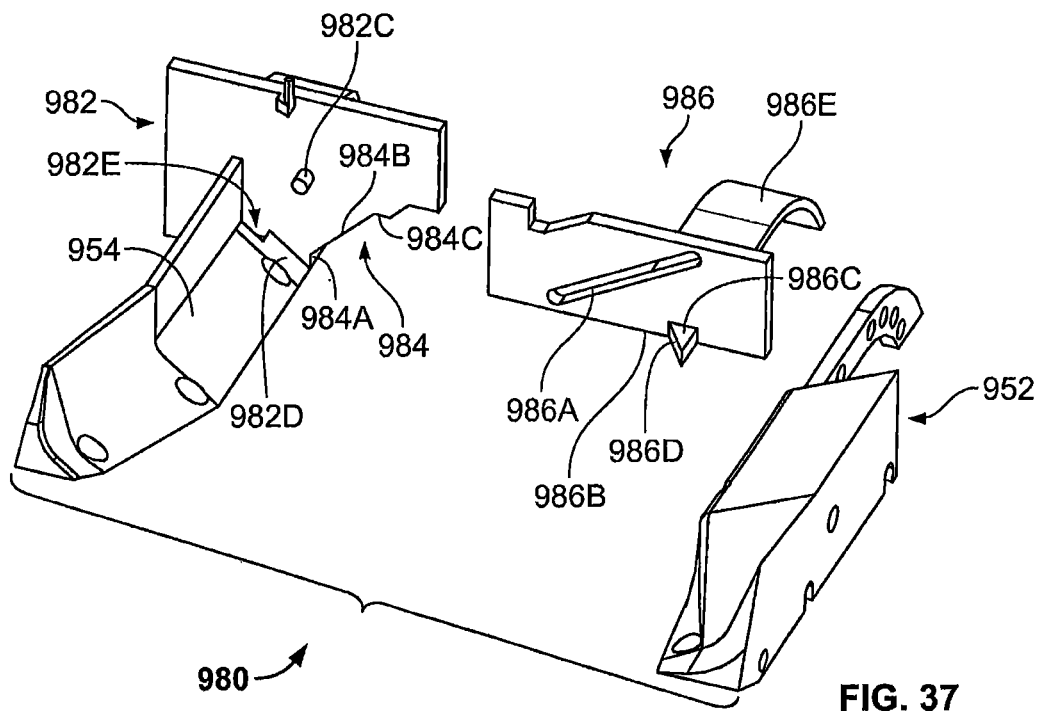
FIG. 37 is an exploded, rear perspective view of the gate system of FIG. 32.

With reference to FIGS. 36 and 37, the gate member 982 includes a body 982A and an internally threaded adjustment bore 982B. The control member 987 includes a threaded shank 987A and a control handle or knob 987B (FIG. 33). The control member 987 is rotatably fixed in the housing 910 and the shank 987A is received in the bore 982B such that rotation of the shank 987A causes the gate member 982 to translate laterally left or right depending on the direction of rotation of the knob 987B. In use, the knob 987B can be used to manipulate the gate member 982 and force the gate member 982 to slide along the axis N-N. However, other features and mechanisms may be provided for positioning the gate member 982.

Figure 32:
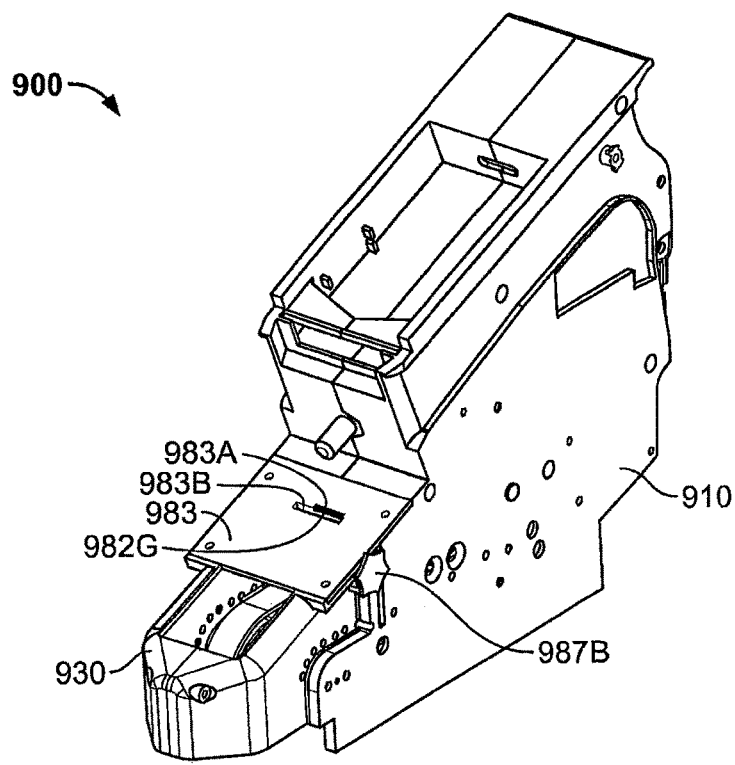
FIG. 32 is a front perspective view of a dispensing bin according to further embodiments of the invention.

The bin 900 may further include a gate position indicator system to indicate to a user the setting of the gate system 980. In the illustrated embodiment, as shown in FIG. 32, the gate member 982 is further provided with an integral indicator feature 982G, and the bin 900 includes a cover member 983 having a slot 983B and visible indicia 983A (e.g., molded, printed or embossed on the cover member 983). The indicator feature 982G extends through or is viewable through the slot 983B and may thereby be used to determine the position of the gate member 982 (and thereby the gate system 980) by reference to its position relative to the indicia 983A.

The gate member 982 further includes a guide feature, protrusion, pin or peg 982C, a support ledge 982D (defining a slot 982E), the left baffle 954, and side guide wall 982F all integral with the body 982A. A downwardly opening cutout 984 is defined in the body 982A by a first (vertical) edge 984A, a second (diagonal) edge 984B, and a third (top, horizontal) edge 984C. According to some embodiments, the diagonal edge 984B forms an angle of about 35 to 55 degrees and, in some embodiments, about 45 degrees with respect to the belt 966.

The second gate member 986 (FIGS. 36 and 37) includes a through slot 986A having a guide slot axis G-G extending diagonally and transversely to the vertical gate member axis M-M, the horizontal gate member axis N-N, and the bin drive axis L-L. According to some embodiments, the slot axis G-G forms an angle O with the axis F-F (FIG. 39).

The gate member 986 has a lower edge 986B and an integral top guide wall 986E. A slot 986F is formed in the wall 986E to slidably receive the gate member 982. The gate member 986 further includes an integral redirector protrusion or feature 986C adjacent the lower edge 986B. The redirector feature 986C has an engagement surface 986D defining an angle K (in a horizontal plane; FIG. 38) with respect to the forward direction BF and the belt axis L-L. According to some embodiments, the angle K is in the range of from about 30 to 60 degrees.

The gate members 982, 986 may be formed of any suitable material or materials. According to some embodiments, the gate members 982, 986 are formed of materials as described above for the housing 110.

As noted above, the gate member 982 is mounted in the slots 927 over the belt 966. The gate member 986 is mounted in the slot 929 rearward of the gate member 982 such that the lower edge 986B is slidably seated in the support slot 982E and the guide peg 982C is interlocked with and slidably seated in the guide slot 986A. When the gate system 980 is assembled in the housing 910, the gate opening 944 is defined by the lower edge 986B, the cutout edges 984A, 984B, an edge 952A of the right side baffle 952, and the belt 966.

In use, in order to adjust the dimensions of the gate opening 944, the gate member 982 is slid along the axis N-N to enlarge and reduce the size of the gate opening 944, depending on the direction of travel, by rotating the knob 987B. As the gate member 982 is slid, the guide peg 982C acts on the gate member 986 via the slot 986A to raise and lower the gate member 986 (and thereby the lower edge 986B) in the slot 929. In this manner, the operator can adjust the width GW of the gate opening 944 (by directly repositioning the edges 984A, 984B) and also automatically adjust the height GH of the gate opening 944 by indirectly repositioning the lower edge 986B.

Notably, the baffle 954 is affixed to the gate member 982 for movement therewith. As a result, adjustment of the gate member 982 causes the baffle 954 to slide over the belt 966 and likewise adjust the effective width of the guide channel 956.

Furthermore, the guide walls 952A, 982F, 986B collectively form a forwardly extending, semi-tubular guide shroud 953 over the belt 966 from the gate opening 944 to the exit end of the belt 966. The width and height of the guide channel 953A defined by the shroud 953 are automatically adjusted with the adjustment of the gate members 982, 986. The shroud 953 can laterally and vertically constrain the dispensed tablets T to a defined path on the belt 966. This can assist in preventing the dispensed tablets T from becoming jammed or delayed and can more precisely place the tablets through the nozzle outlet 930B.

The redirector feature 986C can assist in funneling the tablets to the gate opening 944 in the appropriate or prescribed orientation. In particular, when a tablet T standing upright on its edge is driven by the belt 966 toward the opening 944, the upright tablet T will contact the redirector feature 986C and be toppled over thereby so that it is properly oriented to pass through the gate opening 944. According to some embodiments, the redirector feature 986C does not extend below the edge 986B, so that the redirector feature 986C does not engage tablets T that are properly oriented (e.g., lying flat).

It will be appreciated that the gate system 980 can be operated and function as described above with regard to the gate system 880. Thus, it will be appreciated that the various relationships, specifications and advantages as described with respect to the gate system 880 may likewise apply or be incorporated into the gate system 980 (e.g., a substantially fixed GW:GH; gate width GW greater than the gate height GH throughout a range of operational settings; gate width GW set to [tablet width+tablet height+a prescribed tolerance/gap width]; gate system 980 configured such that gate height GH is maintained at a prescribed fraction gate width GW plus a prescribed tolerance/gap width; substantially constant or uniform ratio GW:GH; cutout edge 984B obliquely angled with respect to the top edge 984C and the belt 966; gate opening 944 automatically configuring so that the gate width GW is greater than the gate height GH).

While a knob 987B is shown and described for applying adjustment inputs to the gate system 980, other mechanisms may be employed. For example, the bin 900 may employ an automatic electronic control system as described above with regard to the bin 800. The gate system 980 may be selectively adjustable using an electronically controlled actuator such as a solenoid or electric motor.

The feed control system 990 can prevent too many pills from entering the staging area 942 or main chamber and jamming up. The feed control system 990 includes a feed wheel 992, a control flap 996, and an electronic control system 991. The control system includes a feed drive actuator 994.

Figure 35:
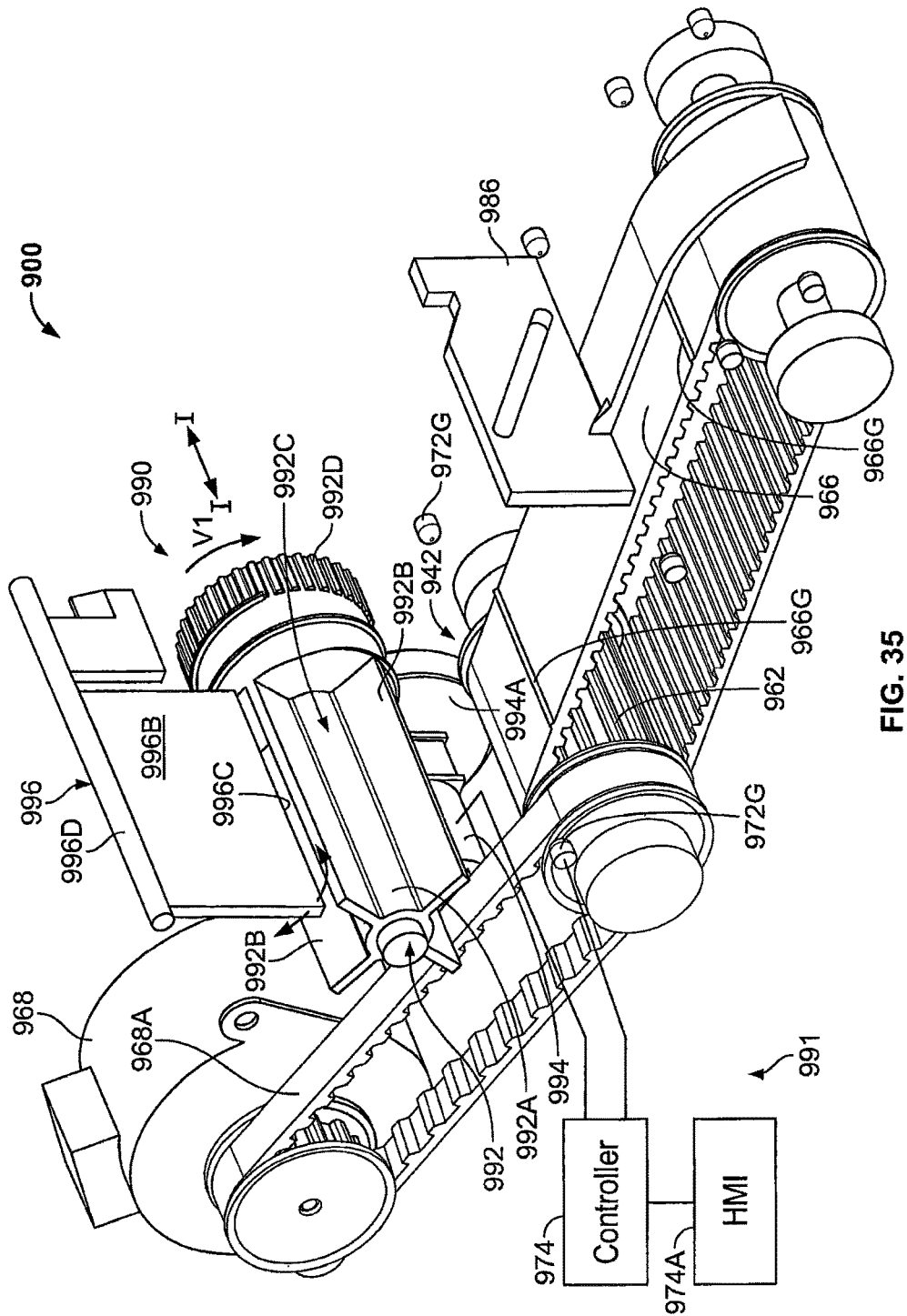
FIG. 35 is a fragmentary, front perspective view of the dispensing bin of FIG. 32.

With reference to FIG. 35, the feed wheel 992 includes a body, hub or shaft 992A, integral paddles, walls or partitions 992B and an integral transmission section 992D. Circumferentially distributed pockets or cavities 992C are defined between the partitions 992B and are sized to hold one or more tablets T. The wheel 992 is rotatably mounted in the housing 910 to permit rotation about a rotation axis I-I in a forward or feeding direction V1. The wheel 992 may be formed of any suitable material (e.g., as described above for the housing 110). The feed wheel 992 is positioned between the staging region 942 and the hopper chamber 920A. In some embodiments, the wheel 992 is located adjacent the floor of the hopper chamber 920A (e.g., partially embedded in the hopper floor as shown) and positioned such that tablets are prevented from escaping the hopper chamber 920A under the wheel 992.

The feed actuator 994 may be an electric motor, for example. A transmission wheel 994A is affixed to the end of a drive shaft of the actuator 994 and is fitted with an elastomeric O-ring 994B. The O-ring 994B bears against the transmission section 992D so that, when the wheel 994A is driven in a direction V2, the feed wheel 992 is correspondingly driven in the feed direction V1.

The flap 996 includes a body 996B and a free terminal edge 996C located adjacent the wheel 992. The flap 996 is mounted on the housing 910 by a mounting portion 996D such that the body 996B and the free edge 996C are permitted to swing or deflect fore and aft as indicated by the arrows in FIG. 35. In some embodiments and as illustrated, the flap 996 is pivotally mounted on the housing 910. In some embodiments, the flap 996 is formed of a flexible material (e.g., an elastomer) in whole or in part such that it can deflect by bending. In some embodiments, the flap 996 is biased into a closed position (as shown); (e.g., by a spring).

Figure 34:
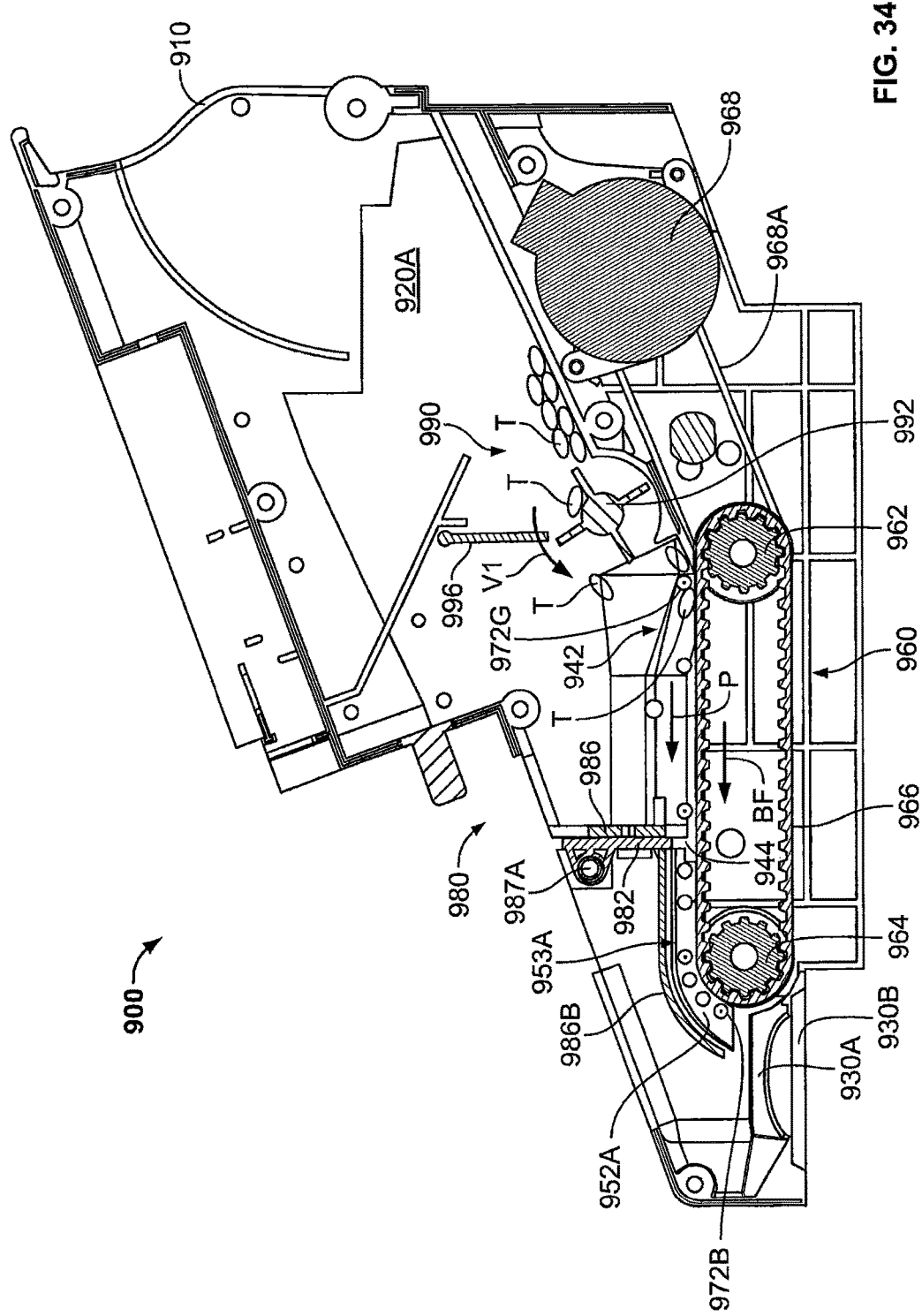
FIG. 34 is a cross-sectional view of the dispensing bin of FIG. 32.

The electronic control system 991 includes the electronically controlled actuator 994, a controller 974, and a tablet detector 972G (e.g., the photodetector; FIG. 34) located in the tablet staging region 942. The controller 974 is electrically connected to the detector 972G to receive the tablet detection signals therefrom. The controller 974 is electrically connected to the actuator 994 to provide control signals thereto. A human machine interface (HMI) 974A may be provided for the operator to input commands.

In use, the actuator 994, under the control of the controller 974, drives the feed wheel 992 to rotate in the feed direction V1. The rotating feed wheel 992 receives (e.g., by gravity feed) tablets T from the hopper chamber 920A into the cavities 992C, transports the tablets over the wheel 992 and past the flap 996, and drops the tablets T into the staging region 942. In some embodiments, the wheel 992 drops the tablets directly onto the belt 966. The deposited tablets T are then conveyed by the forwardly driven belt 966 and dispensed as described herein. In this manner, the feed control system controllably meters the delivery of tablets T from the hopper chamber 920A to the staging region 942 and the belt 966.

In some embodiments, the controller 974 automatically and programmatically controls the actuator 994 to adjust the start, stop and/or rate of rotation of the wheel 992. According to some embodiments, the controller 974 uses the detection signals from the detector 972G to control the actuator 994. For example, the wheel 992 may be driven by the controller 974 to deliver tablets when no tablets are detected by the detector 972G, and stopped when a tablet is detected by the detector 972G. According to some embodiments, the detector 972G and the detection signals provide a feedback loop to the controller 974 so that the controller sets or adjusts the rate of rotation of the wheel 992 in accordance with the frequency of signals from the detector indicating the absence of a tablet. In some embodiments, the controller 974 adjusts the rate of rotation of the wheel 992 as a function or in correspondence with the forward travel speed of the belt 966.

According to some embodiments, the active feed control system 990 is replaced or supplemented with an active feed control system according to an alternative design. For example, an actuator (e.g., electric motor) driven auger or a second drive belt may be located between the hopper chamber 920A and the staging region 942 and configured to forcibly transport tablets therebetween under the control of the controller 974.

In some cases, it may be necessary or desirable to physically agitate the tablets T or break up a jam of the tablets T in the hopper or elsewhere in the bin. For this purpose, a bin according to embodiments of the invention (e.g., the bin 100, 200 or 800) may be provided with an agitation or jam breaker mechanism. The mechanism may include a vibrator device (e.g., an oscillating motor) that imparts vibration to the tablets directly or through another component or components. In some embodiments, the mechanism includes a displacement member that is moved against or through the tablets by applying electrical current to and removing current from a muscle wire operatively connected to the displacement member, wherein the muscle wire changes dimension responsive to the variation in current.

In some embodiments, the agitation mechanism includes a passive feature such as an irregularity or non-uniformity on the conveyor belt or another component to bulge, bump, shake, vibrate or the like periodically in a manner that tends to agitate or dislodge the tablets.

For example, with reference to FIG. 35, the conveyor belt 966 is shown therein provided with longitudinally spaced apart, transversely extending passive agitation nonuniformities or features in the form of ribs 966G projecting upwardly from the tablet engagement/carrying surface. As the conveyor belt 966 revolves about the rollers 962, 964, the ribs 966G displace and thereby agitate the tablets T. For example, the ribs 966G may agitate the tablets that are being singulated at the gate opening 944, that have collected or jammed, and/or that are not moving at the pace of the belt 966. The agitation features may take forms other than straight ribs, such as texturing.

Figure 40:
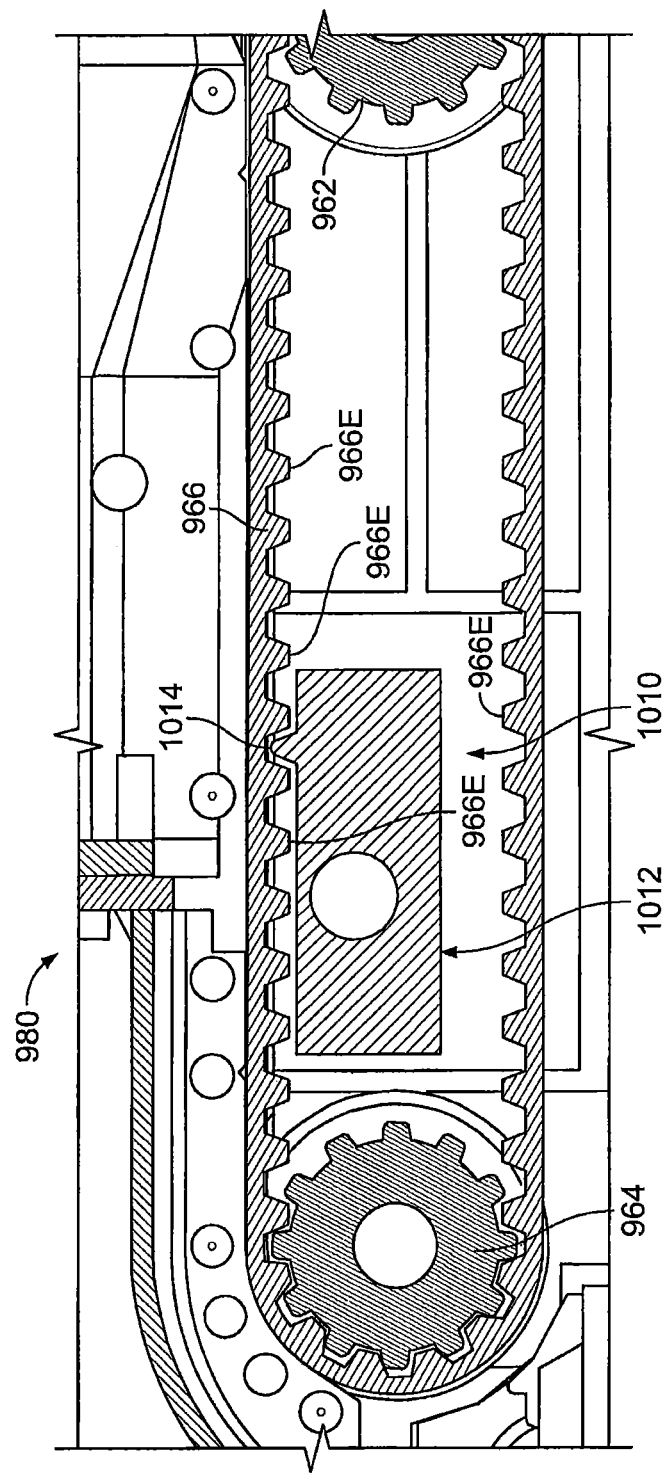
FIG. 40 is a fragmentary, side view of the dispensing bin of FIG. 32 showing an optional agitation mechanism.

FIG. 40 shows another passive tablet agitation mechanism 1010 for agitating the tablets T. The agitation mechanism 1010 includes an agitation member 1012 including an interference feature 1014. The feature 1014 is configured and positioned such that it has interference with the teeth 966E of the conveyor belt 966 as the belt 966 revolves about the rollers 962, 964. As the teeth 966E ride over the feature 1014, vibration is induced in the belt 966, which in turn agitates the tablets T on the belt 966 by vibration.

Figure 41:
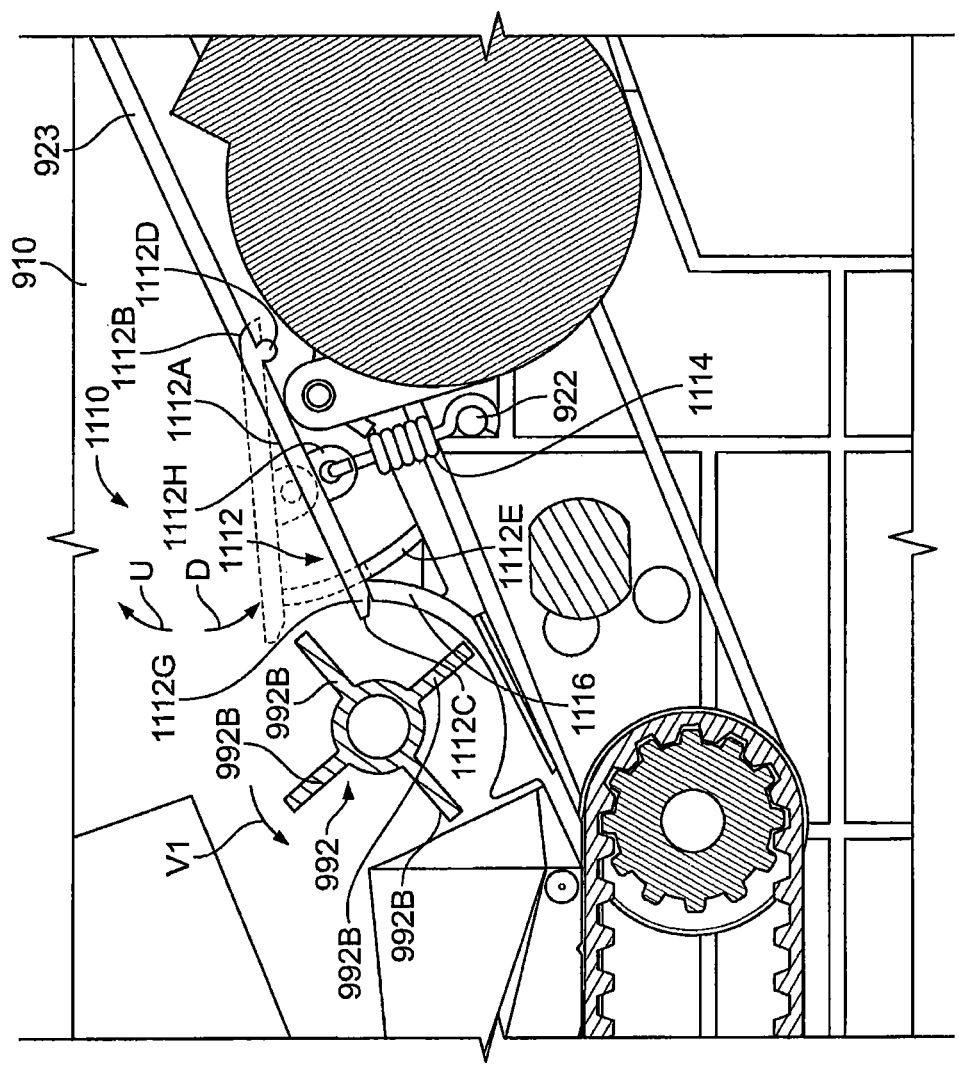
FIG. 41 is a fragmentary, side view of the dispensing bin of FIG. 32 showing a further optional agitation mechanism.
Figure 42:
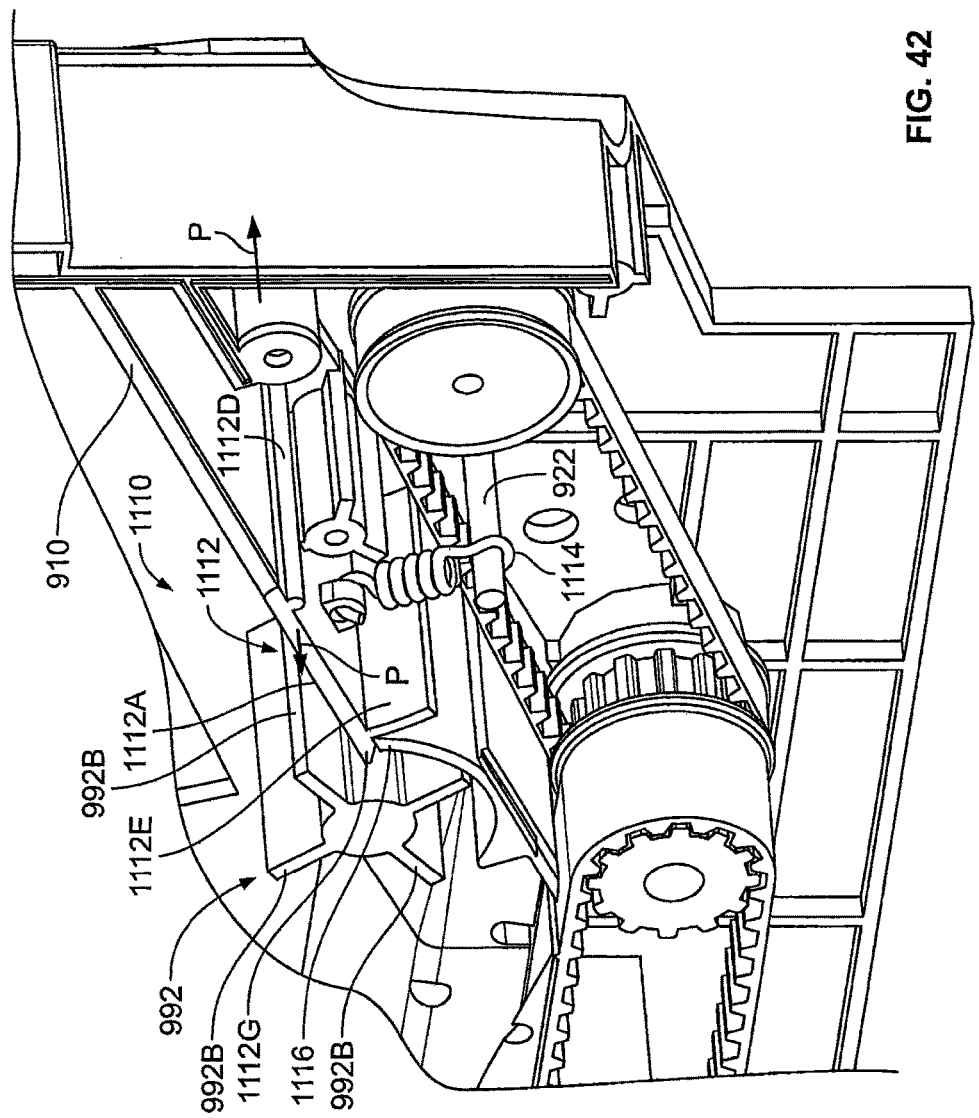
FIG. 42 is a fragmentary, rear perspective view of the bin of FIG. 41.

FIGS. 41 and 42 show another tablet agitation mechanism 1110 for agitating the tablets T in the hopper chamber 920A. In particular, the agitation mechanism 1110 may inhibit or prevent bridging behind the feed wheel 992. The agitation mechanism 1110 includes a movable floor member 1112, a biasing member 1114 (e.g., a coil spring), and a floor stop 1116.

The floor member 1112 includes a planar support panel or floor portion 1112A extending from a rear end 1112B to a front end 1112C. The floor member 1112 is pivotably coupled or hinged to the housing 910 by a hinge feature 1112D to permit the floor portion 1112A to pivot or rotate in an upward direction U and a downward direction D about a pivot axis P. The floor member 1112 further includes a shield skirt or wall 1112E depending from the floor portion 1112A adjacent the front end 1112C. An engagement flange 1112G extends across the front end 1112C forward of the shield wall 1112E. A spring mount feature 1112H is also provided on the lower side of the floor member 1112. The biasing member 1114 is anchored at one end of the spring mount feature 1112H and at its opposite end to a spring mount feature 922 on the housing 910.

In use, the biasing member 1114 biases the floor member 1112 down into an at-rest, lower position as shown in solid lines in FIGS. 41 and 42. In the lower position, the engagement flange 1112G abuts the stop feature 1116 to limit downward rotation and the floor portion 1112A may be substantially coplanar with an adjacent, rearward floor portion 923 of the housing 910.

As the feed wheel 992 is driven to rotate in the direction V1, the partitions 992B will sequentially strike, lift and release the engagement flange 1112G. More particularly, each partition 992B will catch the portion of the flange 1112G extending forwardly beyond the stop feature 1116 and displace or drive the floor member 1112 to pivot in the upward direction U to a raised position as shown in dashed lines in FIG. 41. The shield wall 1112E closes the gap between the flange 1112G and the stop feature 1116. As the partition 992B continues its rotation, it releases the flange 1112G, permitting the floor member 1112 to return to the lower position under the force of the biasing member 1114. In this manner, the wheel 992 displaces, vibrates or oscillates the floor member 1112 to agitate the tablets thereon.

Bins as disclosed herein can be used in dispensing systems of any suitable type or design. For example, the bins of the present invention can be used in semi-automated or "instant access" systems. According to some embodiments, a bin according to embodiments of the invention (e.g., the bin 100, 200 or 800) is a direct replacement for and is installed in place of an air driven dispensing bin such as disclosed in U.S. Pat. No. 7,837,061 to Dummer, U.S. Published Patent Application No. 2009/0294464 to Michelli et al., U.S. Pat. No. 7,263,411 to Shows et al., U.S. Pat. No. 7,014,063 to Shows et al., and U.S. Published Patent Application No. 2009/0043421 to Parrish et al.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A dispensing apparatus for dispensing articles, the dispensing apparatus comprising:
    a dispensing outlet;
    a nonlinear guide channel;
    a dispensing path extending through the nonlinear guide channel to the dispensing outlet; and
    a drive system including:
        a belt; and
        a belt actuator operable to drive the belt;
    wherein the dispensing apparatus is configured to convey articles on the belt in a dispensing direction along the dispensing path toward the dispensing outlet to be dispensed;
    wherein the nonlinear guide channel is configured to singulate the articles as the articles are conveyed along the dispensing path and through the nonlinear guide channel toward the dispensing outlet to be dispensed; and
    wherein the dispensing apparatus is operable to selectively drive the belt in a reverse direction to convey the articles along the dispensing path away from the dispensing outlet.

2. The dispensing apparatus of claim 1 wherein:
    the nonlinear guide channel includes a receiving section and a singulating section between the receiving section and the dispensing outlet; and
    the singulating section is narrower than the receiving section.

3. The dispensing apparatus of claim 1 wherein the nonlinear guide channel includes an arcuate singulating section.

4. The dispensing apparatus of claim 1 wherein the nonlinear guide channel includes a plurality of singulating sections defining a zig-zag path for the articles as the articles are conveyed by the belt toward the dispensing outlet.

5. The dispensing apparatus of claim 1 wherein the nonlinear guide channel is defined by opposed baffles.

6. The dispensing apparatus of claim 1 including:
    a housing including:
        a hopper chamber to hold the articles;
        the dispensing outlet;
        the nonlinear guide channel; and
        the dispensing path, wherein the dispensing path extends between the hopper chamber and the dispensing outlet and through the nonlinear guide channel;
    wherein the dispensing apparatus is configured such that articles disposed in the hopper chamber are directed onto the belt and the belt, when driven by the belt actuator, conveys the articles received from the hopper chamber in the dispensing direction along the dispensing path toward the dispensing outlet to be dispensed.

7. The dispensing apparatus of claim 6 including an active feed control system including an article transport member and a feed actuator to drive the article transport member to transfer articles from the hopper chamber to the belt.

8. The dispensing apparatus of claim 1 including a singulating wall having a singulating opening defined therein, wherein the singulating opening is configured and positioned to singulate the articles as the articles are conveyed along the dispensing path toward the dispensing outlet to be dispensed.

9. The dispensing apparatus of claim 1 including a singulating gate system defining a singulating opening to singulate the articles as the articles are conveyed along the dispensing path toward the dispensing outlet to be dispensed, wherein the singulating gate system is selectively adjustable to change and set at least one dimension of the singulating opening.

10. The dispensing apparatus of claim 1 including a rotatable singulating wheel operable to pick up articles from the belt at a pick up location and sequentially deposit the articles downstream from the pick up location to thereby singulate the articles.

11. The dispensing apparatus of claim 1 including an agitation mechanism configured to agitate the articles on the belt.

12. A method for dispensing articles, the method comprising:
    providing a dispensing apparatus including:
        a dispensing outlet;
        a nonlinear guide channel;
        a dispensing path extending through the nonlinear guide channel to the dispensing outlet; and
        a drive system including:
            a belt; and
            a belt actuator operable to drive the belt;
    dispensing articles, including driving the belt using the belt actuator to convey articles on the belt in a dispensing direction along the dispensing path toward the dispensing outlet to be dispensed; and
    selectively driving the belt in a reverse direction to convey the articles along the dispensing path away from the dispensing outlet;
    wherein the nonlinear guide channel singulates the articles as the articles are conveyed along the dispensing path and through the nonlinear guide channel toward the dispensing outlet to be dispensed.

13. The method of claim 12 wherein:
    the nonlinear guide channel includes a receiving section and a singulating section between the receiving section and the dispensing outlet; and
    the singulating section is narrower than the receiving section.

14. The method of claim 12 wherein the nonlinear guide channel includes an arcuate singulating section.

15. The method of claim 12 wherein the nonlinear guide channel includes a plurality of singulating sections defining a zig-zag path for the articles as the articles are conveyed by the belt toward the dispensing outlet.

16. The method of claim 12 wherein the nonlinear guide channel is defined by opposed baffles.

17. The method of claim 12 wherein:
the dispensing apparatus further includes:
a housing including:
a hopper chamber to hold the articles;
the dispensing outlet;
the nonlinear guide channel; and
the dispensing path, wherein the dispensing path extends between the hopper chamber and the dispensing outlet and through the nonlinear guide channel; and
the method further includes:
placing the articles in the hopper chamber; and
directing the articles from the hopper chamber onto the belt, wherein the belt, when driven by the belt actuator, conveys the articles received from the hopper chamber in the dispensing direction along the dispensing path toward the dispensing outlet to be dispensed.

18. The method of claim 12 wherein the dispensing apparatus includes a singulating wall having a singulating opening defined therein, and the singulating opening is configured and positioned to singulate the articles as the articles are conveyed along the dispensing path toward the dispensing outlet to be dispensed.

19. The method of claim 12 wherein the dispensing apparatus includes a singulating gate system defining a singulating opening to singulate the articles as the articles are conveyed along the dispensing path toward the dispensing outlet to be dispensed, and the singulating gate system is selectively adjustable to change and set at least one dimension of the singulating opening.

20. A dispensing apparatus for dispensing articles, the dispensing apparatus comprising:
a dispensing outlet;
a nonlinear guide channel;
a dispensing path extending through the nonlinear guide channel to the dispensing outlet; and
a drive system including:
a belt; and
a belt actuator operable to drive the belt;
wherein the dispensing apparatus is configured to convey articles on the belt in a dispensing direction along the dispensing path toward the dispensing outlet to be dispensed;
wherein the nonlinear guide channel is configured to singulate the articles as the articles are conveyed along the dispensing path and through the nonlinear guide channel toward the dispensing outlet to be dispensed; and
wherein the dispensing apparatus includes a singulating gate system defining a singulating opening to singulate the articles as the articles are conveyed along the dispensing path toward the dispensing outlet to be dispensed, wherein the singulating gate system is selectively adjustable to change and set at least one dimension of the singulating opening.

21. A dispensing apparatus for dispensing articles, the dispensing apparatus comprising:
a dispensing outlet;
a nonlinear guide channel;
a dispensing path extending through the nonlinear guide channel to the dispensing outlet; and
a drive system including:
a belt; and
a belt actuator operable to drive the belt;
wherein the dispensing apparatus is configured to convey articles on the belt in a dispensing direction along the dispensing path toward the dispensing outlet to be dispensed;
wherein the nonlinear guide channel is configured to singulate the articles as the articles are conveyed along the dispensing path and through the nonlinear guide channel toward the dispensing outlet to be dispensed; and
wherein the dispensing apparatus includes a rotatable singulating wheel operable to pick up articles from the belt at a pick up location and sequentially deposit the articles downstream from the pick up location to thereby singulate the articles.

22. A dispensing apparatus for dispensing articles, the dispensing apparatus comprising:
a dispensing outlet;
a nonlinear guide channel;
a dispensing path extending through the nonlinear guide channel to the dispensing outlet; and
a drive system including:
a belt; and
a belt actuator operable to drive the belt;
wherein the dispensing apparatus is configured to convey articles on the belt in a dispensing direction along the dispensing path toward the dispensing outlet to be dispensed;
wherein the nonlinear guide channel is configured to singulate the articles as the articles are conveyed along the dispensing path and through the nonlinear guide channel toward the dispensing outlet to be dispensed; and
wherein the dispensing apparatus includes an agitation mechanism configured to agitate the articles on the belt.

23. A method for dispensing articles, the method comprising:
providing a dispensing apparatus including:
a dispensing outlet;
a nonlinear guide channel;
a dispensing path extending through the nonlinear guide channel to the dispensing outlet; and
a drive system including:
a belt; and
a belt actuator operable to drive the belt; and
dispensing articles, including driving the belt using the belt actuator to convey articles on the belt in a dispensing direction along the dispensing path toward the dispensing outlet to be dispensed;
wherein the nonlinear guide channel singulates the articles as the articles are conveyed along the dispensing path and through the nonlinear guide channel toward the dispensing outlet to be dispensed; and
wherein the dispensing apparatus includes a singulating gate system defining a singulating opening to singulate the articles as the articles are conveyed along the dispensing path toward the dispensing outlet to be dispensed, and the singulating gate system is selectively adjustable to change and set at least one dimension of the singulating opening.

24. A method for dispensing articles, the method comprising:
providing a dispensing apparatus including:
a dispensing outlet;
a nonlinear guide channel;

a dispensing path extending through the nonlinear guide channel to the dispensing outlet; and a drive system including:

a belt;

a belt actuator operable to drive the belt; and a rotatable singulating wheel;

dispensing articles, including:

driving the belt using the belt actuator to convey articles on the belt in a dispensing direction along the dispensing path toward the dispensing outlet to be dispensed; and operating the singulating wheel to pick up articles from the belt at a pick up location and sequentially deposit the articles downstream from the pick up location to thereby singulate the articles;

wherein the nonlinear guide channel singulates the articles as the articles are conveyed along the dispensing path and through the nonlinear guide channel toward the dispensing outlet to be dispensed.

25. A method for dispensing articles, the method comprising:

providing a dispensing apparatus including:

a dispensing outlet;

a nonlinear guide channel;

a dispensing path extending through the nonlinear guide channel to the dispensing outlet; and a drive system including:

a belt;

a belt actuator operable to drive the belt; and an agitation mechanism; and dispensing articles, including:

driving the belt using the belt actuator to convey articles on the belt in a dispensing direction along the dispensing path toward the dispensing outlet to be dispensed; and agitating the articles on the belt using the agitation mechanism;

wherein the nonlinear guide channel singulates the articles as the articles are conveyed along the dispensing path and through the nonlinear guide channel toward the dispensing outlet to be dispensed.

* * * * *

UNITED STATES PATENT AND TRADEMARK OFFICE
CERTIFICATE OF CORRECTION

PATENT NO. : 10,457,473 B2
APPLICATION NO. : 16/241295
DATED : October 29, 2019
INVENTOR(S) : Daniels et al.

Page 1 of 1

It is certified that error appears in the above-identified patent and that said Letters Patent is hereby corrected as shown below:

In the Specification

Column 24, Line 36: Please correct "111211" to read -- 1112H --

Column 24, Line 39: Please correct "111211" to read -- 1112H --

Signed and Sealed this
Third Day of March, 2020

Andrei Iancu
*Director of the United States Patent and Trademark Office*